US011301877B2

(12) United States Patent
Cheesman et al.

(10) Patent No.: US 11,301,877 B2
(45) Date of Patent: Apr. 12, 2022

(54) PROVIDING ANALYSIS OF PERCEPTION DATA OVER TIME FOR EVENTS

(71) Applicant: QUALTRICS, LLC, Provo, UT (US)

(72) Inventors: Larry Dean Cheesman, Provo, UT (US); Milind Kopikare, Draper, UT (US)

(73) Assignee: Qualtrics, LLC, Provo, UT (US)

( * ) Notice: Subject to any disclaimer, the term of this patent is extended or adjusted under 35 U.S.C. 154(b) by 420 days.

(21) Appl. No.: 15/254,750

(22) Filed: Sep. 1, 2016

(65) Prior Publication Data

US 2018/0060883 A1   Mar. 1, 2018

(51) Int. Cl.
| | | |
|---|---|---|
| G06Q 30/02 | (2012.01) | |
| H04L 29/08 | (2006.01) | |
| G06F 3/0484 | (2013.01) | |
| H04L 67/306 | (2022.01) | |
| G06F 3/04842 | (2022.01) | |

(52) U.S. Cl.
CPC ....... *G06Q 30/0201* (2013.01); *H04L 67/306* (2013.01); *G06F 3/04842* (2013.01)

(58) Field of Classification Search
CPC .............. G06Q 30/0201; H04L 67/306; G06F 3/04842
USPC ...................................................... 705/7.32
See application file for complete search history.

(56) References Cited

U.S. PATENT DOCUMENTS

| | | |
|---|---|---|
| 8,606,645 B1 | 12/2013 | Applefeld |
| 8,666,978 B2 | 3/2014 | Moganti et al. |
| 9,581,457 B1 | 2/2017 | Meredith et al. |
| 9,721,386 B1 | 8/2017 | Worley et al. |
| 2002/0036649 A1 | 3/2002 | Kim et al. |
| 2002/0128898 A1 | 9/2002 | Smith et al. |
| 2002/0129052 A1 | 9/2002 | Glazer et al. |
| 2003/0220831 A1 | 11/2003 | Son |
| 2007/0048699 A1* | 3/2007 | MacGregor .......... G09B 17/006 434/178 |
| 2007/0078720 A1 | 4/2007 | Ravikumar et al. |

(Continued)

OTHER PUBLICATIONS

"Pre-Course Key Segment Analysis of Online Lecture Videos" to Che et al, Jun. 23, 2016 (Year: 2016).*

(Continued)

*Primary Examiner* — Charles Guiliano
*Assistant Examiner* — Po Han Lee
(74) *Attorney, Agent, or Firm* — Keller Preece PLLC

(57) ABSTRACT

Embodiments of the present disclosure relate to administration of an electronic survey to collect perception ratings for an event. For example, an electronic survey system provides a perception survey question to a respondent client device for an event (e.g., a digital media event or a live user experience). As a user associated with the respondent client device experiences the event, the user indicates a perception rating over time for the event by interacting with a graphical input element corresponding to the perception survey question. The survey system collects perception data points indicating the perception rating of the user and associates information about the user with the perception data points. The survey system can generate response data for the perception survey question based on the perception data points. The survey system can also generate a perception data report using the user profile information.

20 Claims, 11 Drawing Sheets

(56) References Cited

U.S. PATENT DOCUMENTS

| | | | |
|---|---|---|---|
| 2008/0082394 A1* | 4/2008 | Floyd | G06Q 30/0202 705/7.32 |
| 2008/0114845 A1 | 5/2008 | Rao | |
| 2011/0196801 A1 | 8/2011 | Ellis et al. | |
| 2011/0231424 A1 | 9/2011 | Avdanina | |
| 2011/0256520 A1 | 10/2011 | Siefert | |
| 2011/0289431 A1 | 11/2011 | Olumoko et al. | |
| 2012/0011006 A1* | 1/2012 | Schultz | G06Q 10/10 705/14.73 |
| 2012/0116878 A1 | 5/2012 | Falk et al. | |
| 2012/0192235 A1 | 7/2012 | Tapley et al. | |
| 2012/0237918 A1 | 9/2012 | Kaida | |
| 2012/0310750 A1 | 12/2012 | Schutzbank et al. | |
| 2013/0003993 A1* | 1/2013 | Michalski | H04B 7/1851 381/119 |
| 2013/0044130 A1 | 2/2013 | Geisner et al. | |
| 2013/0054435 A1 | 2/2013 | Zhang et al. | |
| 2013/0086077 A1 | 4/2013 | Piippo et al. | |
| 2013/0173461 A1 | 7/2013 | Levy | |
| 2013/0288219 A1* | 10/2013 | Dheap | G09B 7/12 434/350 |
| 2013/0293580 A1 | 11/2013 | Spivack | |
| 2013/0314421 A1 | 11/2013 | Kim | |
| 2013/0330703 A1 | 12/2013 | Chivukula | |
| 2013/0335573 A1 | 12/2013 | Forutanpour et al. | |
| 2014/0071163 A1 | 3/2014 | Kinnebrew et al. | |
| 2014/0129354 A1 | 5/2014 | Soon-Shiong | |
| 2014/0139551 A1 | 5/2014 | McCulloch et al. | |
| 2014/0214670 A1 | 7/2014 | Mckenna | |
| 2014/0225922 A1 | 8/2014 | Sbardella | |
| 2014/0278786 A1* | 9/2014 | Liu-Qiu-Yan | G06Q 30/0201 705/7.32 |
| 2014/0298260 A1 | 10/2014 | Abowd et al. | |
| 2014/0306994 A1 | 10/2014 | Brown et al. | |
| 2014/0330618 A1 | 11/2014 | Wong et al. | |
| 2014/0362111 A1 | 12/2014 | Kim | |
| 2014/0375683 A1 | 12/2014 | Salter et al. | |
| 2015/0012426 A1 | 1/2015 | Purves et al. | |
| 2015/0035861 A1 | 2/2015 | Salter et al. | |
| 2015/0046296 A1 | 2/2015 | Hart | |
| 2015/0242865 A1* | 8/2015 | Richards | G06Q 10/103 705/7.32 |
| 2015/0339453 A1 | 11/2015 | Richards et al. | |
| 2016/0055674 A1 | 2/2016 | Mullins et al. | |
| 2016/0133154 A1* | 5/2016 | Cortes | G09B 5/065 434/157 |
| 2016/0205431 A1* | 7/2016 | Avedissian | H04N 21/4312 725/37 |
| 2016/0217620 A1 | 7/2016 | Constantinides | |
| 2016/0267740 A1 | 9/2016 | Weyl et al. | |
| 2016/0277424 A1 | 9/2016 | Mawji et al. | |
| 2016/0299563 A1 | 10/2016 | Stafford et al. | |
| 2016/0313877 A1 | 10/2016 | Ha et al. | |
| 2016/0370954 A1 | 12/2016 | Burningham et al. | |
| 2017/0039613 A1 | 2/2017 | Kaehler et al. | |
| 2017/0039988 A1 | 2/2017 | Whiting et al. | |
| 2017/0072319 A1* | 3/2017 | Bostick | A63F 13/79 |
| 2017/0180980 A1 | 6/2017 | Courtright et al. | |
| 2017/0293958 A1 | 10/2017 | Tang | |
| 2017/0323481 A1 | 11/2017 | Tran et al. | |
| 2017/0365101 A1 | 12/2017 | Samec et al. | |
| 2018/0004283 A1 | 1/2018 | Mathey-Owens et al. | |
| 2018/0040161 A1 | 2/2018 | Tierney et al. | |
| 2019/0139318 A1 | 5/2019 | Tierney et al. | |

OTHER PUBLICATIONS

U.S. Appl. No. 15/226,699, Feb. 23, 2018, Office Action.
U.S. Appl. No. 14/743,745, May 14, 2018, Office Action.
U.S. Appl. No. 14/816,983, Jul. 27, 2018, Office Action.
U.S. Appl. No. 14/743,745, Nov. 2, 2017, Office Action.
U.S. Appl. No. 14/816,983, Jan. 19, 2018, Office Action.
U.S. Appl. No. 15/226,699, Sep. 19, 2018, Notice of Allowance.
U.S. Appl. No. 14/816,983, Dec. 13, 2018, Notice of Allowance.
U.S. Appl. No. 16/241,728, Feb. 25, 2019, Office Action.
U.S. Appl. No. 14/743,745, May 31, 2019, Office Action.
U.S. Appl. No. 14/743,745, Sep. 18, 2019, Notice of Allowance.
U.S. Appl. No. 16/241,728, Oct. 28, 2019, Office Action.
U.S. Appl. No. 16/370,157, May 7, 2020, Office Action.
U.S. Appl. No. 16/241,728, Feb. 6, 2020, Office Action.
U.S. Appl. No. 16/241,728, Sep. 9, 2020, Office Action.
U.S. Appl. No. 16/241,728, Jan. 6, 2021, Office Action.
U.S. Appl. No. 16/370,157, Aug. 28, 2020, Notice of Allowance.
Alex Walz, Rethinking the Mobile Surveys vs. Web Surveys Debate, Apr. 15, 2016, pp. 1-12. (Year: 2015).
U.S. Appl. No. 16/773,684, May 7, 2021, Office Action.
U.S. Appl. No. 16/773,684, Feb. 9, 2021, Office Action.
U.S. Appl. No. 16/773,684, dated Oct. 22, 2021, Notice of Allowance.

* cited by examiner

PROVIDING ANALYSIS OF PERCEPTION DATA OVER TIME FOR EVENTS

BACKGROUND

Perception ratings of viewers for various types of events provide valuable information about the event. For example, a perception rating can describe a viewer's feelings or thoughts about the event as a whole or for specific moments or messages in the event. Using the perception ratings, content providers, event organizers, and other analysts can use perception ratings from an event to determine the reaction by a plurality of viewers to the event. Marketing/PR strategists and/or content providers can then determine how to improve messages/content to increase perception ratings.

Collecting accurate perception ratings from a plurality of viewers can be difficult. Specifically, many conventional survey systems provide survey questions to viewers of an event after the event has ended. For example, after viewing an event, a conventional survey system may present one or more survey questions about the event to one or more viewers to gauge the viewers' perception of a specific moment in the event. Providing questions only after the event has ended forces the viewers to rely on their memory recall, which can be unreliable due to viewers forgetting how the viewers felt or why they felt a certain way due to the amount of time that has passed.

Some conventional survey systems attempt to overcome the disadvantages with relying on viewers' recall by gathering perception data from viewers during an event. For example, some conventional survey systems use proprietary devices that include dials or buttons that allow the viewers to provide real-time responses and reactions to questions related to the event. While conventional systems are capable of collecting real-time perception data from users during an event, the systems typically rely on collecting the data from focus groups. The use of focus groups can be very useful for certain types of surveys, but focus groups are also often limited in the number of respondents in the focus group because of the number of available devices, costs associated with compensating respondents, and size of the location where the respondents are viewing the event.

Conventional survey systems that gather perception data related to events in real-time (e.g., in focus groups) are also often limited by the variation of responses that viewers can provide. In particular, the use of proprietary devices that collect real-time perception data from the viewers limits the responses of the viewers to the capabilities of the physical hardware of the proprietary devices. For example, a device that includes a dial limits surveys to questions that can be answered using the dial. Such limitations can potentially limit the types of perception ratings that viewers are able to provide, thereby limiting the usefulness of the perception data.

Accordingly, these and other disadvantages exist with respect to conventional systems and methods for obtaining perception ratings for an event.

SUMMARY

Embodiments of the present disclosure provide benefits and/or solve one or more of the foregoing or other problems in the art with systems and methods for providing perception ratings for an event. Specifically, the systems and methods enable collection and reporting of perception ratings during an event from a plurality of users. For example, the systems and methods can enable presentation of a digital media event on a client device (e.g., a mobile device) of a user. The systems and methods receive perception data from the client device of the user indicating a perception rating of the event over a time period. For instance, the perception data includes a plurality of perception data points based on the user's interaction with a graphical input element presented on the user's client device in connection with the event. Thus, the systems and methods can administer electronic surveys to a plurality of users across a plurality of client devices to obtain the perception ratings of the users during the presentation of various types of events such as streaming video or audio presented on the client devices.

Additionally, the systems and methods associate information about users with the respective perception data points. For example, the systems and methods determine a user identifier associated with a perception data point set from a client device of a user. Based on the user identifier, the systems and methods access user profile information from a user profile. The systems and methods then associate the accessed user profile information from the user profile with the perception data point set. Using the received perception data and/or the user profile information, the systems and methods can generate response data, such as perception data reports or additional survey questions.

Additional features and advantages of the embodiments will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These, and other features, will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the disclosure and are not therefore considered to be limiting of its scope, the disclosure will be described and explained with additional specificity and detail through the use of the accompanying drawings, in which.

DETAILED DESCRIPTION

Figure 1:
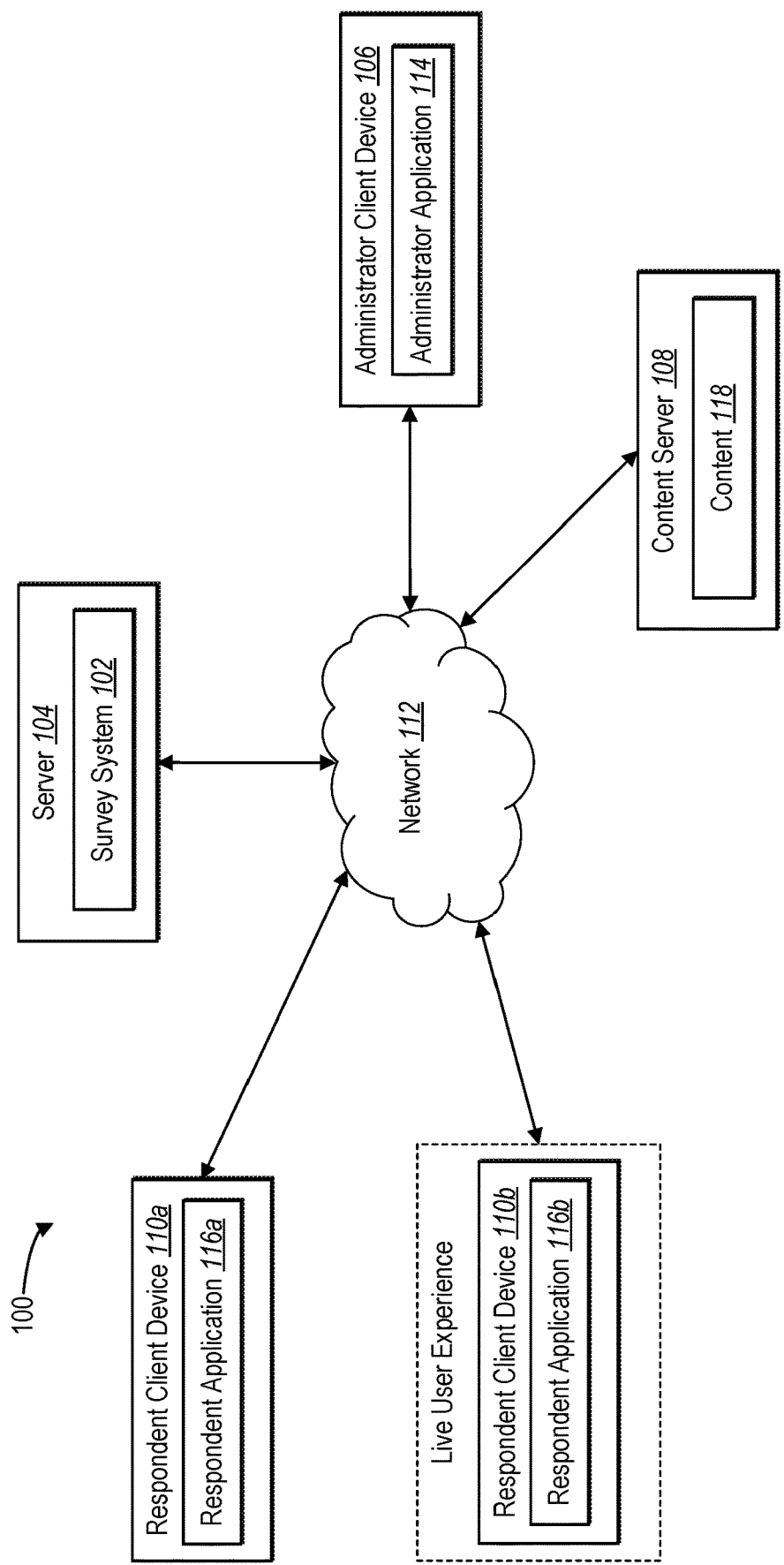
FIG. 1 illustrates a block diagram of an environment in which a survey system operates in accordance with one or more embodiments.

One or more embodiments disclosed herein provide a survey system that administers electronic surveys to a plurality of client devices. In one or more embodiments, the survey system administers an electronic survey by providing one or more electronic survey questions to a client device of a user in connection with an event (e.g., a digital media event or a live user experience). For instance, administering an electronic survey question from an electronic survey includes providing the electronic survey question to the client device to allow the user to indicate a perception rating of the event. Based on a user's interaction with the electronic survey question on the user's client device, the survey system receives perception data points that indicate the user's perception rating of the event over a time period. The survey system can use perception data point sets that the survey system receives from a plurality of client devices to generate response data, including follow-up questions or perception data reports, for the electronic survey question(s) related to the event.

According to one or more embodiments, the survey system administers an electronic survey by allowing a user to indicate, via a client device, a perception rating in connection with an event that the user is experiencing. Specifically, the survey system provides a graphical input element for presentation on the client device in connection with an event. For example, while a user experiences the event, the user can interact with the graphical user input element to indicate the user's perception rating at any given time during the event for a given survey question. Because the user's perception rating may change during the event, the user can modify the perception rating by manipulating the graphical input element on the client device, resulting in a plurality of perception data points that have values associated with particular portions of the event and that vary based on the user's variations in perception ratings over the course of the event.

As a user interacts with the graphical input element to indicate the user's perception rating, the client device can store perception data points at specific times during the event. In particular, the client device can collect the perception data points based on settings that a creator of the survey established prior to administering the survey to the client device. For example, the client device can measure perception data points at specific time intervals, frequencies, or at specific moments during the event. Thus, the survey system collects a plurality of perception data points during an event to allow greater accuracy in determining the user's perception rating throughout the entire event.

In one or more embodiments, the survey system also associates perception data points from a client device with information about a user of the client device. Specifically, the survey system determines a user identifier associated with a perception data point set received from a client device. The survey system then accesses user profile information from a user profile based on the user identifier. The user profile information can include personal information about the user that allows the survey system to classify one or more characteristics of the user into one or more groups. As such, associating the user information with the perception data points allows the survey system to create detailed, dynamic perception data reports.

According to one or more embodiments, the survey system also generates response data for an electronic survey question based on the received perception data points. For instance, the survey system generates response data that allows the survey system to provide follow up questions to verify and/or improve an understanding of the user's perception rating at a given point during the event. Specifically, each perception data point corresponds to a portion of the event. By identifying certain perception data points (e.g., highs/lows), the survey system can provide one or more additional questions to the client device to further determine why a user felt a certain way about a portion of the event.

One or more embodiments of the survey system also provide helpful cues that allow the user to remember a portion of the event for improved accuracy in the answers to any follow up questions. In particular, the survey system can identify a portion of a digital media event corresponding to a particular perception rating and cause the client device to replay the identified portion to the user to refresh the user's memory of the identified portion. Identifying a portion of digital media events can include determining a start time and an end time of the portion of the digital media event, and enabling playback of the portion of the digital media event on the client device with an additional survey question.

In one or more embodiments, the survey system verifies synchronization of perception data points from a client device and corrects the synchronization of the perception data points. Specifically, because the perception data points from a client device correspond to specific portions of an event, the survey system can determine whether the perception data points are correctly synchronized with the event. For example, the survey system can obtain synchronization data such as audio of the event from the client device to verify the synchronization of the perception data points. If the perception data points are not correctly synchronized with the event, the survey system can adjust information associated with the perception data points (e.g., timestamps) based on the synchronization data from the client device.

As described herein, the survey system provides advantages over the conventional systems. Specifically, the survey system administers electronic surveys by providing graphical user interface elements to a plurality of users via individual, non-proprietary client devices (e.g., smartphones, tablets, desktop computers) for a variety of different event types. The survey system can effectively gather moment-to-moment perception ratings from a plurality of users for digital media events such as audio or video hosted on a variety of different platforms, as well as for live user experiences such as concerts, political speeches, and even live broadcast events (e.g., a television or radio show).

Additionally, the survey system is able to verify that perception data associated with any of the different event types, or even for events that encompass multiple different platforms and venues, is accurately synchronized with the respective portions of the event (e.g., synchronizing perception data from user's attending a live event, perception data from user's watching a broadcast of the live event, as well as user's watching a rebroadcast of the same event). As such, the survey system can provide accurate and dynamic reporting of real-time perception ratings for numerous events across a far-reaching, geographically diverse population without being limited to focus groups in tightly controlled settings.

Moreover, the survey system improves the functioning of computing devices used in implementing the survey system. For example, the survey system provides systems and methods to collect uniform perception data from a variety of different devices, which in turn essentially eliminates the constraint of conventional perception data collection systems of using a single type of hardware. In addition, the survey system provides synchronization capabilities to ensure that perception data corresponding to a particular event is synchronized across all user perception data, thus providing accurate perception data across a large number of users, a variety of different client devices, and/or multiple presentation platforms for a particular event. As such, the computing devices within the overall survey system have increased functionality and improved capabilities to administer perception type electronic survey questions in a manner that conventional systems using conventional practices are incapable of providing.

As used herein, the terms "electronic survey" or simply "survey" refer to an electronic communication used to collect information. For example, the term survey may include an electronic communication in the form of a poll, questionnaire, census, or other type of sampling. Further, the term survey as used herein may generally refer to a method of requesting and collecting electronic data from respondents via an electronic communication distribution channel. As used herein, the term "respondent" refers to a person or entity that participates in, and responds to, a survey. Also, as used herein, the term "administrator" refers to a person or entity that creates and administers survey.

Additionally, as used herein, the terms "survey question" or simply "question" refers to a prompt included in a survey to invoke a response from a respondent. For example, a survey question can include one of many different types of questions, including, but not limited to, perception, multiple choice, open-ended, ranking, scoring, summation, demographic, dichotomous, differential, cumulative, dropdown, matrix, net promoter score (NPS), single textbox, heat map, and any other type of prompt that can invoke a response from a respondent. A survey question can include a question portion as well as an available answer portion that corresponds to the survey question.

As used herein, the term "response" refers to electronic data provided as a content item by a respondent. The electronic data may include content and/or feedback from the respondent in response to a survey question. Depending on the question type, the response may include, but is not limited to, a selection, a text input, an indication of an answer selection, a user provided answer, and/or an attachment. For example, a response to a perception survey question can include a plurality of perception data points that indicate a perception rating of the respondent over a time period associated with an event.

As used herein, the term "event" refers to a user experience over a time period. For example, an event can include a digital experience on a client device of a user, including streaming video/audio (e.g., a movie, TV show, song). In another example, an event can include a live user experience that is not presented on a client device of the user. To illustrate, an event can include a user experience via another device, such as a television program or a radio show, or an in-person user experience, such as a concert or a political debate/speech. As noted above, an event can be live, semi-live, and/or a replay or recorded version of the event.

As used herein, a "perception rating" refers to a ranking or classification of the user's perception of the event in accordance with a survey question. For example, a perception rating can indicate positive or negative feelings of the user during the event, agreement or disagreement with content of the event, or other indications of comparative assessment of a quality, standard, or performance associated with the event. In one or more embodiments, the survey system represents perception ratings using perception data points where each perception data point corresponds to a portion of the event.

FIG. 1 illustrates an environment 100 in which a survey system 102 operates. The description associated with FIG. 1 provides an overview of the environment 100 that includes the survey system 102. A more detailed description of the components and processes of the survey system 102 are provided in relation to the remaining figures.

Specifically, FIG. 1 illustrates a server 104, an administrator client device 106, a content server 108, and a plurality of respondent client devices 110a, 110b. Additionally, each of the administrator client device 106 and respondent client devices 110a, 110b may be associated with users (e.g., administrator and plurality of respondents, respectively). Each of the devices in the environment 100 of FIG. 1 can communicate with one or more other devices in the environment 100. For example, the server 104 can communicate with the administrator client device 106, the content server 108, and the respondent client devices 110a, 110b over a network 112. As described in greater detail below, the server 104 can perform or provide functions and processes of the methods and systems described herein. Additionally, the administrator client device 106 and/or the respondent client devices 110a, 110b can perform or provide at least some of the functions and processes of the methods and systems described herein.

According to one or more embodiments, the server 104 includes the survey system 102 for creating and administering electronic surveys to a plurality of respondents and collecting response data associated with the electronic surveys. In one example, the server 104 is a single server computing device. Alternatively, the server 104 includes a plurality of server computing devices, such as a plurality of server computing devices connected via a network 112. Thus, the survey system 102 runs on one or more server computing devices to allow administrators to create and manage surveys on the server computing device(s) and to administer the surveys to a plurality of respondents.

In one or more embodiments, the administrator client device 106 and the respondent client devices 110a, 110b can be any type of computing devices that allow the administrator and respondents, respectively, to perform operations associated with creating, administering, and/or interacting with electronic surveys. For example, the computing devices can include mobile devices (e.g., smartphones, tablets, laptops, wearable devices), desktop devices, or other types of devices. Furthermore, the administrator and respondents can create, administer, or otherwise interact with electronic surveys by way of various input devices, including a mouse, a touchscreen, sensors, cameras, or other input devices. Additional details with respect to computing devices are discussed below with respect to FIGS. 8-9.

The survey system 102 allows an administrator to create electronic surveys to administer to a plurality of respondents in connection with various events. In particular, the survey system 102 administers an electronic survey created based on information the administrator client device 106 provides to the survey system 102. For instance, the administrator client device 106 can communicate with the server 104 to allow the administrator to create an electronic survey by interacting with survey creation interface (e.g., a web interface) within an administrator application 114 of the administrator client device 106. To illustrate, the administrator can create one or more survey questions for the survey using an administrator application 114 (e.g., a web browser) on the administrator client device 106 to access the server 104 hosting the survey system 102. The administrator client device 106 can send information from inputs related to an electronic survey (e.g., survey question content and type) to the server 104 for the survey system 102 to host and administer the electronic survey to the plurality of respondent client devices 110a, 110b.

The survey system 102 administers the electronic survey by sending data related to the electronic survey to the respondent client devices 110a, 110b. For example, the survey system 102 can communicate with the respondent client devices 110a, 110b to provide the electronic survey in response to requests by the respondent client devices 110a, 110b to provide the electronic survey to the respondent client devices 110a, 110b. The survey system 102 can also determine an event that is associated with an electronic survey based on information from the administrator client device 106, the respondent client devices 110a, 110b, or both. Although FIG. 1 illustrates only two respondent client devices 110a and 110b, it is understood that the survey system 102 can provide an electronic survey, and receive response data from, any number of respondent client devices.

After receiving the electronic surveys, the respondent client devices 110a, 110b can present the electronic surveys within respondent applications 116a, 116b. Specifically, a respondent uses a respondent application (e.g., a survey application or a media application with survey capabilities) on the corresponding respondent client device to respond to a survey question. The respondent client device detects a respondent's interactions with the survey question, and in response collects or otherwise generates response data based on the detected interactions. The respondent client device can then send the collected response data to the survey system 102 on the server 104.

As described in more detail below, the respondent client devices 110a, 110b collect perception data indicating the respondent's perception ratings for an event. In particular, the respondent applications 116a, 116b can identify perception ratings of the respondents over a period of time associated with the event. For example, the respondent applications 116a, 116b can collect perception data points that indicate the perception ratings, as determined by the survey. The respondent client devices 110a, 110b can send the perception data points to the survey system 102 on the server 104 during and/or after the event.

In one or more embodiments, the survey system 102 provides a survey that corresponds with a digital media event. In particular, the survey system 102 can provide the electronic survey to a first respondent client device 110a in connection with a digital media event that the first respondent client device 110a presents to a respondent. For example, the survey system 102 can identify a digital video for presentation on the first respondent client device 110a and provide the survey for presentation on the first respondent client device 110a along with the digital video (e.g., the survey and digital video are presented simultaneously). According to one or more implementations, the first respondent client device 110a receives the survey and the digital media event from the server 104 (i.e., the digital media event is hosted on the server 104). According to one or more alternative implementations, the first respondent client device 110a receives the survey from the server 104 and communicates with the content server 108 to obtain the digital media event from content 118 stored on the content server 108. Thus, the respondent can respond to a survey question while watching the digital video via the respondent application or via a plurality of applications on the first respondent client device 110a.

In one or more embodiments, a respondent client device provides a survey in connection with an event that is not presented on the respondent client device. For example, a second respondent client device 110b can present the survey within a respondent application in connection with a live user experience that the respondent associated with the second respondent client device 110b experiences. To illustrate, the second respondent client device 110b can provide the survey to the respondent in connection with a television show, a radio show, a concert, a live show, a political debate, or any other event not presented on the second respondent client device 110b that the respondent can experience over a period of time.

According to one or more embodiments, the survey system 102 can provide the same survey to the first respondent client device 110a and the second respondent client device 110b. In particular, the respondents corresponding to the first respondent client device 110a and the second respondent client device 110b can be experiencing the same event through different media. For example, the respondent corresponding to the first respondent client device 110a can be experiencing an event via a digital media stream (e.g., a live video stream of a political debate), while the respondent corresponding to the second respondent client device 110b can be experiencing the event in person (e.g., attending the political debate). Thus, the respondents can interact with the survey questions on the respective devices to provide perception data for the same event via different event platforms (e.g., viewing a live video stream versus live in-person attendance).

After obtaining survey data (e.g., perception data or answers to other survey questions) from the respondent client devices 110a, 110b, the survey system 102 generates additional response data based on the received data. For example, the survey system 102 can generate additional questions based on the received survey data. Alternatively, the survey system 102 can generate data reports based on the received survey data. In one or more embodiments, the survey system 102 accesses user profiles associated with the respondents to identify user profile information for generating the data reports. The server 104 can then send the data reports to the administrator client device 106 for the administrator to view, or to another device for a marketer or other user to view.

Although FIG. 1 illustrates a particular arrangement of the administrator client device 106, server 104, content server 108, respondent client devices 110a, 110b, and network 112, various additional arrangements are possible. For example, the administrator client device 106 may directly communicate with the server 104 hosting the survey system 102, bypassing the network 112. Further, while only one administrator client device 106 and two respondent client devices 110a, 110b are illustrated, the environment 100 can include any number of administrator client devices and respondent client devices (and corresponding users).

Figure 2:
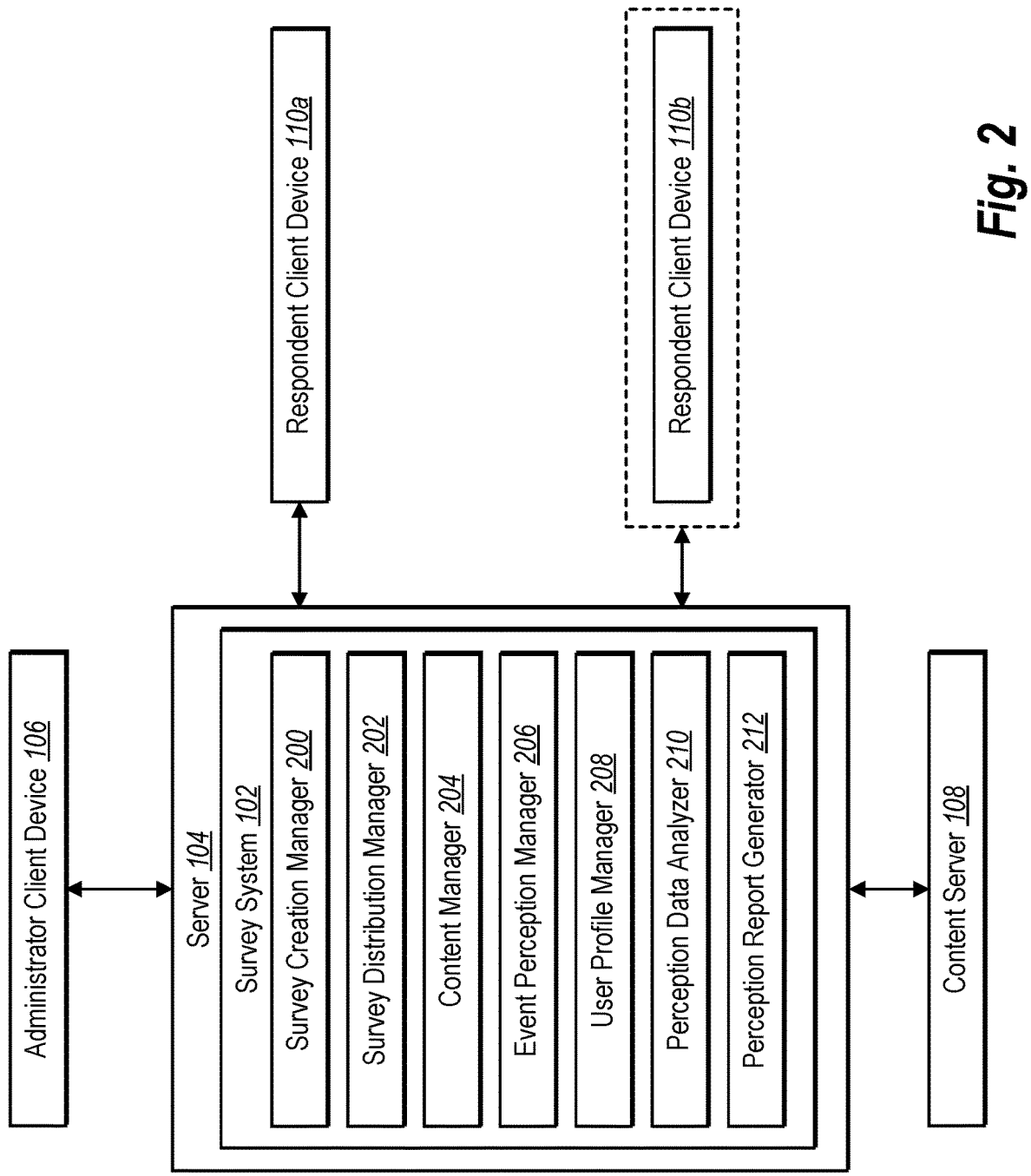
FIG. 2 illustrates a block diagram of the environment of FIG. 1 in which a survey system operates in accordance with one or more embodiments.

FIG. 2 illustrates an example embodiment of an environment that includes the survey system 102 operating on a server 104. Specifically, the server 104 communicates with a plurality of devices (administrator client device 106, content server 108, and respondent client devices 110a, 110b). The survey system 102 includes a survey creation manager 200, a survey distribution manager 202, a content manager 204, an event perception manager 206, a user profile manager 208, a perception data analyzer 210, and a perception report generator 212. Although the survey system 102 is depicted as having various components, the survey system 102 may have any number of additional or alternative components. Alternatively, one or more components of the survey system 102 may be combined into fewer components or divided into more components. Additionally, although FIG. 2 illustrates the survey system 102 on a single server, the survey system 102 may be on any number of server devices.

In one or more embodiments, each of the components and subcomponents of the survey system 102 can be in communication with one another using any suitable communication technologies. It will be recognized that although the subcomponents of the survey system 102 are shown to be separate in FIG. 2, any of the subcomponents may be combined into fewer components, such as into a single component, or divided into more components as may serve a particular implementation. Furthermore, although the components of FIG. 2 are described in connection with the survey system 102, at least some of the components for performing operations in conjunction with the survey system 102 described herein may be implemented on other devices and/or with other systems.

The components of the survey system 102 can include software, hardware, or both. For example, the components of the survey system 102 (e.g., the survey creation manager 200, the survey distribution manager 202, the content manager 204, event perception manager 206, the user profile manager 208, the perception data analyzer 210, and the perception report generator 212) can include one or more instructions stored on computer-readable storage mediums and executable by processors of one or more computing devices. When executed by the one or more processors, the computer-executable instructions of the survey system 102 can cause the computing device(s) to perform the survey creation and administration processes described herein. Alternatively, the components of the survey system 102 can comprise hardware, such as a special purpose processing device to perform a certain function or group of functions. Additionally, the components of the survey system 102 can comprise a combination of computer-executable instructions and hardware.

Furthermore, the components of the survey system 102 performing the functions described herein with respect to survey creation and administration may, for example, be implemented as part of a stand-alone application, as a module of an application, as part of a suite of applications, as a plug-in for applications including content creation applications, as a library function or functions that may be called by other applications, and/or as a cloud-computing model. Thus, various components of the survey system 102 may be implemented as part of a stand-alone application on a personal computing device or a mobile device. For example, the components of the survey system 102 may be implemented in any application that allows the creation and administration of surveys to users, as may serve a particular embodiment.

As illustrated, the survey system 102 includes a survey creation manager 200. The survey creation manager 200 manages the creation of a survey, including the composition of one or more survey questions. For example, the survey creation manager 200 receives information from the administrator client device 106 to create a survey for an identified event. The survey creation manager 200 also receives information from the administrator client device 106 to create one or more survey questions for the survey. To illustrate, the survey creation manager 200 can receive information that a user (e.g., a survey creator or administrator) enters into an administrator application, as previously mentioned. As described herein, at least one of the survey questions comprises a question requesting perception ratings from respondents in relation to the identified event.

Additionally, the survey creation manager 200 can assist a user in creating a survey by providing tools to the user to select various template questions, question types, and/or response types. For example, the survey creation manager 200 can manage the appearance and content of an administrator application provided to the administrator client device 106. As part of assisting a user in creating a survey, the survey creation manager 200 may suggest survey questions to include in the survey. To illustrate, if a user selects a question that prompts a respondent to provide perception ratings during an event, the survey creation manager 200 can recommend that the user also add a follow up question after the event is completed. Alternatively, the survey creation manager 200 can recommend a variety of different survey questions based on the event type.

In one or more embodiments, an administrator can define one or more particular questions to provide to a respondent based on the perception ratings received from the respondent with respect to an event. For instance, if a respondent has a high perception rating for a particular portion of the event, the administrator can define that the survey system provides a first follow up question (e.g., relating to why the respondent had a high perception rating). However, if a respondent has a low perception rating for the same particular portion of the event, the administrator can define that the survey system provides a second follow up question that is different than the first follow up question (e.g., relating to why the respondent had a low perception rating). The same type of conditional The survey creation manager 200 can also provide other features to assist a user in the creation and composition of survey questions to present to respondents. For instance, the survey creation manager 200 may provide alternative wording for questions provided by the user. Further, the survey creation manager 200 can allow the user to preview the set of survey questions as if a respondent was viewing the survey on the respondent's client device, as well as edit a survey that the user is creating or has previously created.

The survey creation manager 200 may also allow a user to specify preferences and/or parameters for one or more surveys. In particular, the survey creation manager 200 can allow a user to specify a beginning date of a survey, a survey's duration, and/or when the survey expires. Thus, the survey creation manager 200 can allow the user to specify the availability of the survey to one or more respondents. The survey creation manager 200 can also enable a user to specify how long a respondent has to complete a survey, or the time (e.g., a minimum and/or maximum time) a respondent has to respond to a survey question.

In one or more embodiments, one or more parameters associated with a survey and/or a survey question may be based on the event. For example, the survey creation manager 200 can identify an event corresponding to the survey based on input received from the administrator client device 106. Based on the identified event, the survey creation manager 200 determines whether a specific parameter is applicable to the event. If a parameter is not applicable to a particular event type, the survey creation manager 200 may not allow the user to select or interact with the parameter.

The survey creation manager 200 also allows a user to specify preferences and/or parameters in connection with individual survey questions. Specifically, each survey question includes a question type (e.g., perception, multiple choice, text entry). The survey creation manager 200 determines which preferences or parameters are displayed to the user on the administrator client device 106 based on the question type. As will be discussed in more detail below, the preferences/parameters associated with a question type allow a user to customize a survey question corresponding to an event in a variety of ways.

As mentioned, the survey system 102 also includes a survey distribution manager 202. After creating a survey, a user can distribute the survey to a plurality of respondents. When the survey system 102 administers a survey, the survey distribution manager 202 may send the survey to designated respondents. For example, the survey distribution manager 202 can send the survey to respondents who have registered for a survey service or opted into receiving surveys by downloading an application. In particular, the survey distribution manager 202 may send surveys to respondents via a specified distribution channel compatible with transmitting and receiving perception data. To illustrate, the distribution channel can include a website, text message, instant message, electronic message, mobile application, etc. In one or more embodiments, the survey distribution manager 202 sends the survey to respondent client devices 110a, 110b via a mobile application that allows respondents to interact with one or more survey questions during an event.

The survey system 102 also includes a content manager 204 to provide content to respondent client devices 110a, 110b. In particular, if an event is a digital media event (e.g., streaming video/audio), the content manager 204 identifies a host for the digital media event. For example, the content manager 204 can identify the host based on information provided during creation of the survey. To illustrate, the content manager 204 can determine that the server 104 hosts the digital media event. Alternatively, the content manager 204 can determine that the content server 108 (e.g., a third party server) hosts the digital media event. If the event is not a digital media event (i.e., is a live user experience), the content manager 204 does not identify the host for the digital media event.

In one or more embodiments, upon identifying that the server 104 hosts a digital media event for a survey, the content manager 204 retrieves the digital media event to provide to a respondent client device. For example, the content manager 204 can send a link or other pointer to the respondent client device 110a to indicate to the respondent client device 110a where to access the digital media event. The content manager 204 can then allow the respondent client device 110a to access the digital media event and begin downloading/streaming the digital media event from the server 104.

Additionally, the content manager 204 links the digital media event to the corresponding survey. Specifically, the content manager 204 can communicate with the survey distribution manager 202 to provide an event identifier to the survey distribution manager 202. The event identifier allows the survey distribution manager 202 to associate the survey to the digital media event so that response data from the respondent client device 110a for the survey is tied to the corresponding event. For digital media events hosted on the server 104, the content manager 204 can obtain an event identifier from a database associated with digital media events stored on the server 104. For digital media events hosted on the content server 108, the content manager 204 can create an event identifier in response to receiving a link (e.g., a URL) to the digital media event on the content server 108.

The survey system 102 also includes an event perception manager 206 to collects responses associated with a survey. In particular, the event perception manager 206 collects responses from a plurality of respondent client devices 110a, 110b based on the corresponding respondents' interactions with one or more survey questions in the survey. For example, the respondents can interact with a graphical user interface (or other input device) on the respondent client devices 110a, 110b to indicate a perception rating associated with a portion of the event. As the respondent interacts with the graphical user interface, the respondent client devices 110a, 110b store perception data (e.g., perception data points) that indicate the perception ratings over a time period for the event. The event perception manager 206 collects the perception data from the respondent client devices 110a, 110b.

In one or more embodiments, the event perception manager 206 collects perception data from the respondent client devices 110a, 110b according to a collection parameter associated with the survey or with a setting of the server 104. For example, the event perception manager 206 can collect perception data at regular intervals during an event. Alternatively, the event perception manager 206 can collect perception data after completion of the event. Collection of the perception data points may be based on the event, such that the event perception manager 206 may collect perception data during some events, while the event perception manager 206 may collect perception data only after completion of other events. To illustrate, the event perception manager 206 can collect perception data at regular intervals during a political debate to allow for real-time reporting of respondent perception ratings, as discussed in more detail below.

In one or more embodiments, the event perception manager 206 collects responses associated with other types of survey questions in addition to perception data. For instance, a survey can include at least one survey question of a perception type and at least one survey question of a different type. The event perception manager 206 can collect response data for all survey questions in a single survey, regardless of type, and sort the response data according to the respondents.

The survey system 102 also includes a user profile manager 208 to manage and store user profile information for a plurality of respondents. Specifically, the user profile manager 208 maintains user profiles including information about a plurality of respondents. For example, the user profile manager 208 can manage a plurality of user profiles for a plurality of respondents who have registered with a survey service and/or opted into receiving surveys by downloading an application associated with the survey system 102. The user profile manager 208 can obtain the profile information based on information that the respondents provide to the survey system 102 (e.g., via a registration website or within a survey application). The user profile manager 208 may also obtain profile information from an application store from which a respondent downloads an application that allows the respondent to respond to surveys.

In one or more embodiments, a user profile includes user profile information that describes one or more characteristics of the respondent. For example, user profile information can include information about the respondent's geographic location, the respondent's demographics (e.g., sex, race, socioeconomic status, political affiliation), the respondent's name, or other information that may be useful in reporting results of the survey. In at least some examples, user profile information includes device information that the user profile manager 208 obtains from a respondent client device in response to a request to provide a survey to the respondent client device. Thus, the user profile manager 208 can obtain information that describes at least a location and a device type of the respondent client device without requiring the respondent to provide other personal information.

As mentioned, the survey system 102 includes a perception data analyzer 210. The perception data analyzer 210 analyzes data collected by the event perception manager 206. In particular, the perception data analyzer 210 communicates with the event perception manager 206 to obtain perception data points associated with responses to a survey. The perception data analyzer 210 analyzes the perception data points to determine perception ratings for each respondent over a time period of the event. For example, the perception data analyzer 210 determines a value of each perception data point from a plurality of perception data points in a perception data set that corresponds to a respondent. Using the determined value, the perception data analyzer 210 can determine the corresponding perception rating.

Additionally, the perception data analyzer 210 can determine correspondences between perception data points and portions of an event. For example, each perception data point from a perception data point set (i.e., a collection of all perception data point sets from a particular correspondent for an event) corresponds to a specific point in time or range of times of an event. Because a perception data point corresponds to a specific portion of the event, the perception rating indicated by the perception data point corresponds to the specific portion of the event. The perception data analyzer 210 determines to which portion of the event a perception data point corresponds based on data received from a respondent client device.

To illustrate, a respondent client device can send synchronization data to the survey system 102 that allows the perception data analyzer 210 to accurately synchronize the perception data point with the correct portion of the event. The perception data analyzer 210 can also use synchronization data from a plurality of respondent client devices 110a, 110b to synchronize the perception data from the plurality of respondents with the event. For example, the perception data analyzer 210 can synchronize perception data from a plurality of respondents even if the respondents are experiencing the event via different communication methods (e.g., a first respondent experiencing a live user experience such as attending an in-person event, and a second respondent watching a streaming video of the event).

The perception data analyzer 210 can also score perform additional analyses on the perception data for an event. For example, the perception data analyzer 210 can score perception data based on how quickly values of perception data points change, identify high/low values, identify outlier values or bad/corrupt data, extreme changes, and/or perform additional analysis operations on the perception data. Thus, the perception data analyzer 210 can provide a variety of analyses for creating dynamic and detailed reports.

Along with generating response data, the perception data analyzer 210 can identify specific portions of a digital media event corresponding to a perception data point by analyzing a digital media event. For example, the perception data analyzer 210 can examine the digital media event to identify a specific time period of the digital media event that corresponds to a perception data point or a plurality of perception data points. Analyzing the digital media event can include digital content analysis techniques, such as visual recognition or audio recognition to identify specific moments in the digital media event. Alternatively, the perception data points can be associated with specific time ranges on the respondent client devices 110a, 110b, and the perception data analyzer 210 can identify the specific time ranges based on metadata associated with the perception data points.

The survey system 102 further includes a perception report generator 212 for generating reports based on received perception data. Specifically, a survey creator, an administrator, or other user may want to view a summary of perception data for an event. The perception report generator 212 receives a request to generate a report and communicates with the perception data analyzer 210 to generate the report using the perception data. To illustrate, the perception report generator 212 can generate one or more visualizations of the perception data that allows a user to identify the different perception ratings for different portions of the event. To generate a visualization, the perception report generator 212 obtains a plurality of perception data point sets and plots the perception data point sets to a graph for the user to view.

Additionally, the perception report generator 212 can communicate with the user profile manager 208 to obtain profile information for respondents who provided perception data for the event. For example, the perception report generator 212 determines a user identifier associated with a perception data point set and accesses a user profile based on the user identifier. The perception report generator 212 can identify user profile information relevant to the request to generate a report. To illustrate, the perception report generator 212 can determine whether the respondent has a specific characteristic in response to a request by a user to generate a report for respondents with the specific characteristic. The perception report generator 212 then generates a report with perception data for only those respondents having the selected characteristic.

Alternatively, the perception report generator 212 can generate a dynamic report that allows a user to change the characteristics without requesting a new report. In particular, when generating a report, the perception report generator 212 can obtain user profile information of a respondent associated with a perception data set and insert the user profile information into metadata of the report. When the user wants to view perception data for respondents with a specific characteristic, the user can select the desired characteristic and the report will update with the corresponding perception data.

The perception report generator 212 can also generate response data for a survey. For example, the perception report generator 212 can use the analyzed perception data to generate and/or provide additional survey questions. To illustrate, the perception report generator 212 can provide a follow up question to a survey based on specific perception ratings in the perception data for the event, such as high points or low points in the data. The follow up question can ask a respondent to provide a response indicating why a respondent gave a specific perception rating for the corresponding portion of the event or why the respondent felt a certain way. The perception report generator 212 can communicate with the survey distribution manager 202 to provide the additional follow up question to the respondent client device. The perception report generator 212 can also use analysis of a digital media event to provide visual/audio playback of a portion of the event in connection with a follow up question.

As described herein, each of the components of the survey system 102 can communicate with one or more storage devices of the server 104 to store data associated with events, including surveys, survey questions, perception data, user profiles, content, and reports. For example, the components of the survey system 102 can communicate with a storage device as described in more detail below in FIG. 9. The components of the survey system 102 can also communicate with storage device(s) to retrieve previously stored data.

Figure 3A:
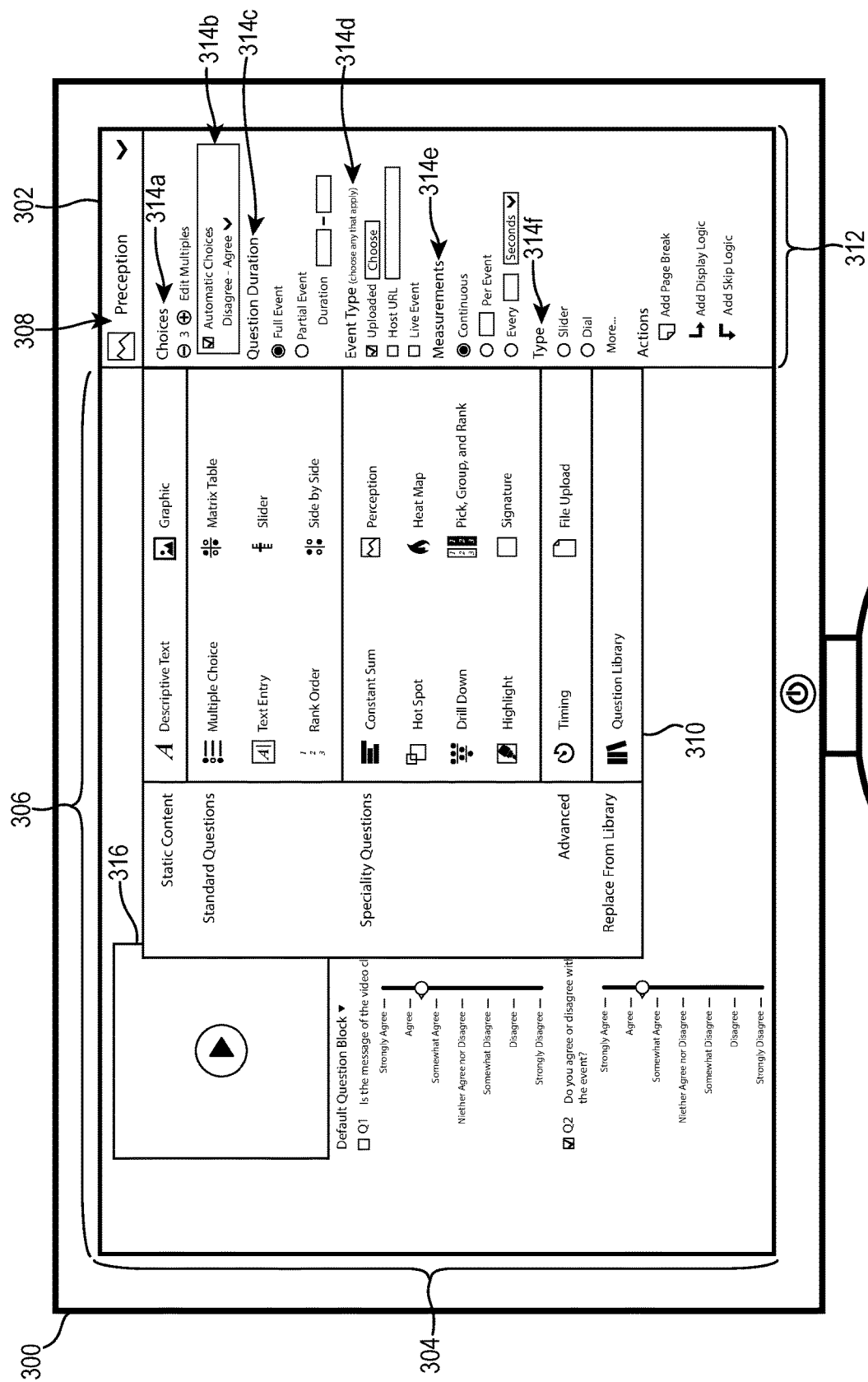
FIGS. 3A-3C illustrate example graphical user interfaces for creating an electronic survey in accordance with one or more embodiments.
Figure 3B:
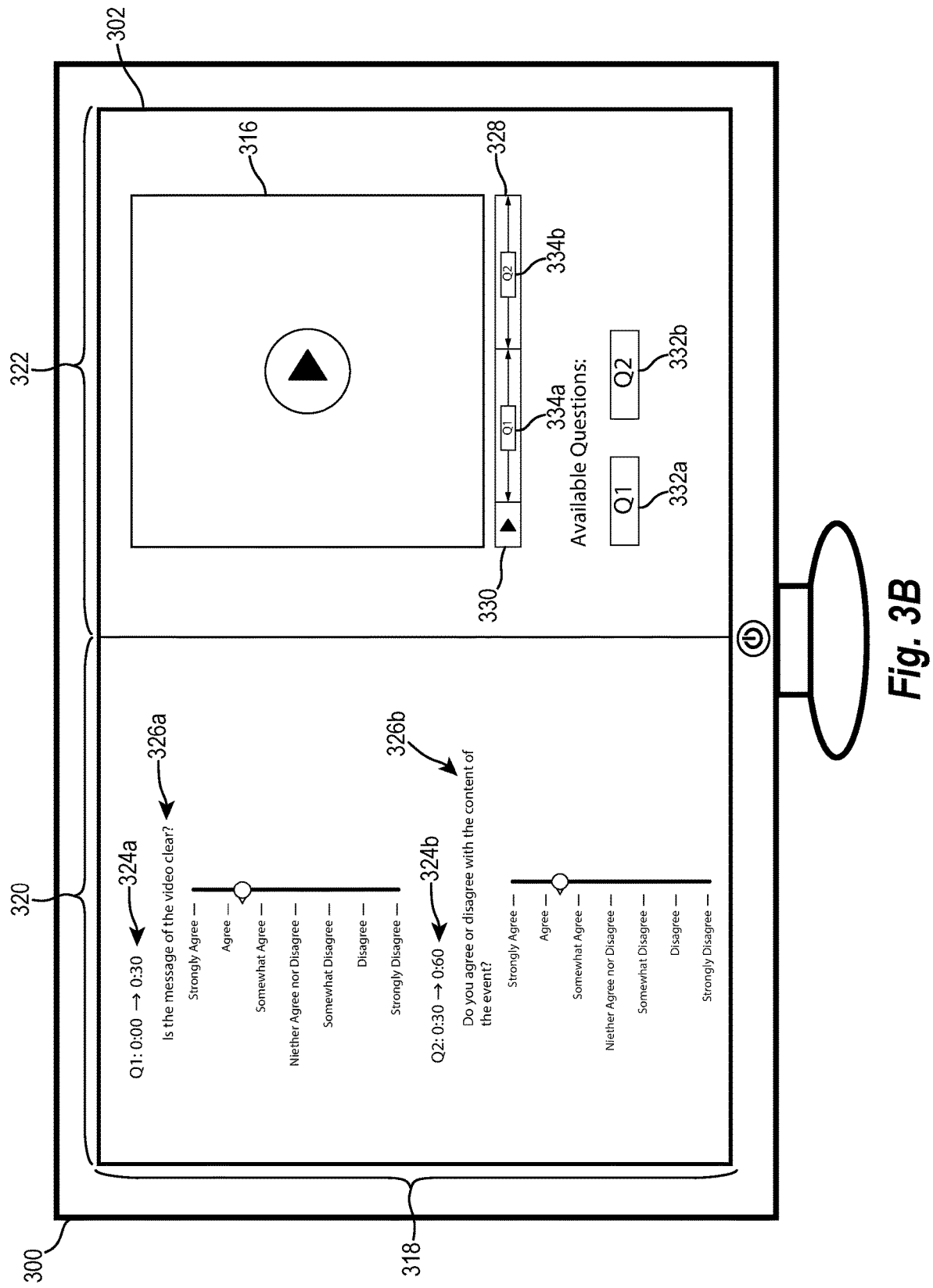
Figure 3C:
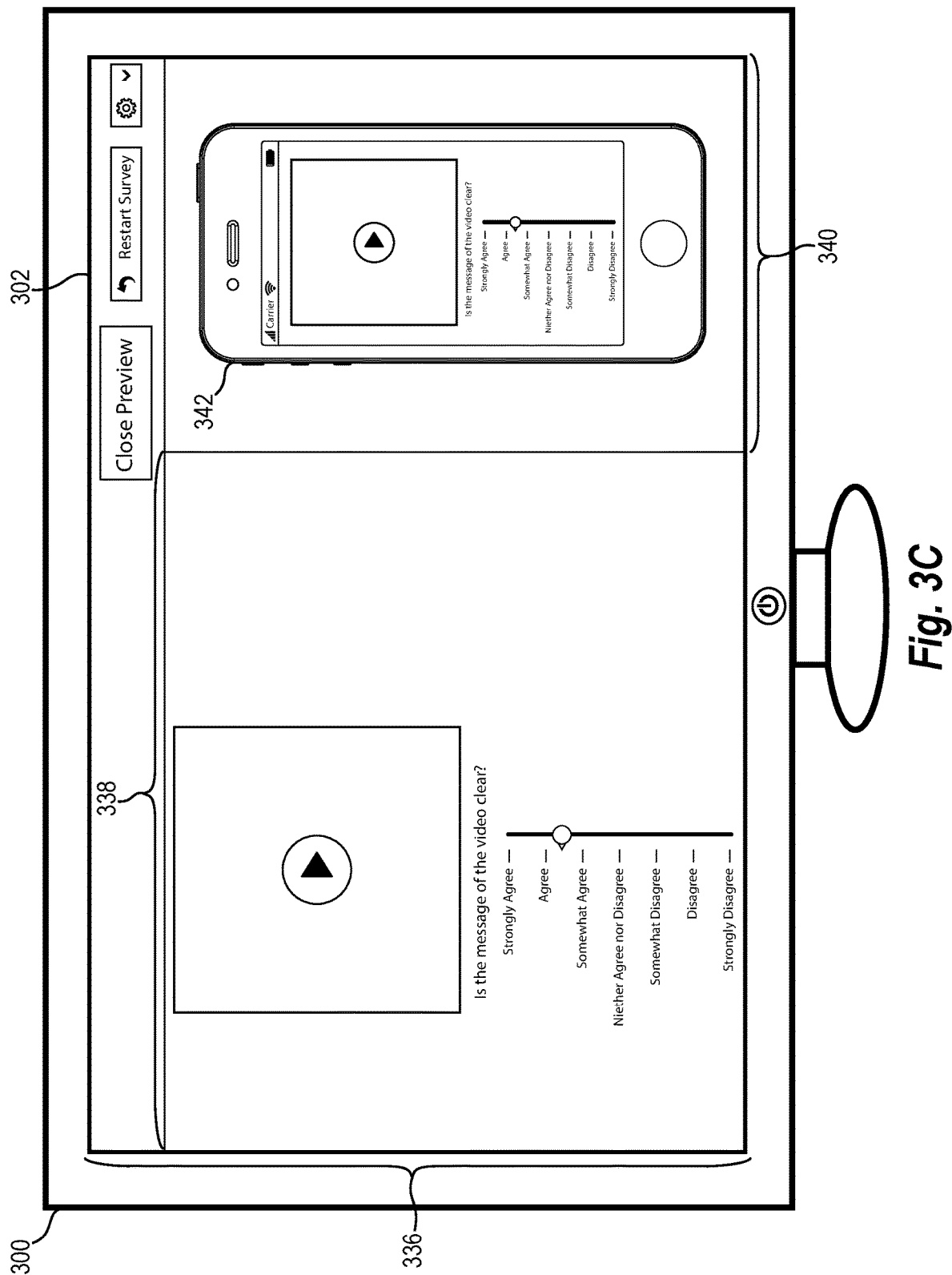

FIGS. 3A-3C illustrate example graphical user interfaces ("GUIs") on an administrator client device 300. The GUIs provide various views of an administrator application for creating and testing a survey. In particular, the administrator application of FIGS. 3A-3C can include an application that allows a user (e.g., an administrator) to create a survey using the survey system as described previously. In one or more embodiments, the administrator application includes a browser-based application that allows a user to log into an administrator account of the survey system to create new surveys and view/edit previously created surveys.

In one or more embodiments, the administrator client device 300 includes as desktop computing device. Although the administrator client device 300 of FIGS. 3A-3C is illustrated as a desktop computing device, the administrator client device 300 can by another type of computing device that allows the user to perform operations associated with the creation and management of electronic surveys. For example, the administrator client device 300 can be a laptop device or a handheld device or mobile device, such as a tablet or smartphone.

With reference to FIG. 3A, the administrator client device 300 includes an administrator application 302 that allows a user to create a survey, including one or more survey questions. Specifically, the administrator application 302 includes a creation interface 304 that displays survey questions and options associated with the survey questions. The creation interface 304 allows a user creating a survey to create and modify one or more survey questions in a survey. For example, the creation interface 304 can include a question section 306 that displays the survey questions in a survey. The question section 306 allows the user to create questions, edit questions, and delete questions in a survey.

In one or more embodiments, the creation interface 304 allows a user to create a new question by selecting an option to create a new question. In one or more embodiments, if the survey does not already include a question, the creation interface 304 provides a default question with default content. For example, the default content can include brief instructions on how to replace the default content with text for the survey question. The user can interact with the default content to replace the default content with question text in a question field and answers for the question in one or more answer fields, depending on the question and question type.

Additionally, the creation interface 304 allows a user to edit an existing question in the question section 306. For instance, the creation interface 304 can allow a user to edit the text in either the question field or the answer field(s) to modify the content of the survey question. To illustrate, a user may modify the question field and/or the answer field(s) to reduce ambiguity in the question or answer(s) and to improve the understandability of the question. Alternatively, the user can delete a question from the survey by interacting with a deletion element for the question in the creation interface 304. The creation interface 304 also allows the user to change the order of the questions within the question section 306.

In one or more embodiments, the creation interface 304 allows the user to select a question type for a survey question. As previously mentioned, a survey question can be one of many different question types. For example, a survey question can include, but is not limited to, such as perception, multiple choice questions, open ended text entry, sliders, rank orders, heat maps, or other question types that allow respondents to provide responses to a survey question. In one or more implementations, selecting a type dropdown menu 308 causes a popup interface 310 or other method of selecting to appear on the creation interface 304. The user can select the question type for the question that provides the most accurate response information from respondents for the specific embodiment. For instance, the user can select a perception type for a survey question that asks respondents to provide a perception rating of an event.

After the user selects the question type for a question, the creation interface 304 modifies the appearance of the question in the question section 306 to reflect the new question type. Specifically, each question type has a specific appearance in the question section 306 due to the type of response information that each question requests. For example, if the question has a perception question type, the creation interface 304 can display the text of the question with a graphical input element with which a respondent can interact during an event. Alternatively, if the question has another question type, the creation interface 304 can display the text of the question with a different visual style (including different response options) based on the selected question type.

In addition to allowing a user to select a question type, the creation interface 304 allows the user to set one or more preferences for each survey question. In particular, the creation interface 304 includes an option section 312 that includes a plurality of options that are specific to the selected question. For example, each question type has a predetermined set of options that the user may set/change for each question of that question type. To illustrate, the perception question type can have a set of options that are unique to the perception question type.

FIG. 3A illustrates the option section 312 for a perception question. As illustrated, the option section 312 includes a plurality of options that affect how a survey question is administered. Specifically, the options allow a user to determine how a survey question is presented on the respondent client devices. Additionally, the options can allow the user to determine how the survey questions function on the respondent client devices.

The options section can include a question number option 314a to set a number of survey questions that appear in the question section 306. Increasing or decreasing the number of questions automatically adds or removes questions from the question section 306. Additionally, the option section 312 can include an automatic choice option 314b that allows a user to select a predefined set of answers for a question. Selecting a predefined set of answers automatically populates the answers in the corresponding question with the predefined set of answers. Deselecting the option allows the user to manually enter answers in the question.

According to one or more embodiments, the option section 312 includes a duration option 314c to set a duration of a survey question. In particular, a user can select whether the question applies to a full event or a partial event. For example, selecting that the question applies to the full event causes respondent client devices to display the question during the entire event, such that the question collects perception data for the full event from all of the respondents. Alternatively, selecting that a question applies to a partial event allows the user to indicate a duration of the question, such as in the case of a plurality of questions, or for displaying a single question during only a specific portion of the event. This allows the user flexibility in determining the times during an event for which the respondent client devices collect perception data for the event.

In one or more embodiments, the option section 312 includes an event type option 314d that affects the type of event to which a survey question applies. In particular, the event type option 314d allows the user to select one or more event types that affect how respondent client devices display the survey question. For example, the event type can include a digital media event hosted by one or more servers on which the survey system operates, a third party content system, or a live user experience (or "live event," as illustrated in FIG. 3A).

The different event types cause the respondent client devices to display the survey question differently on the respondent client devices. For example, if the event is a digital media event, the respondent client devices display the survey question while also displaying the digital media event (e.g., in different portions of a user interface). Alternatively, if the event is a live user experience, the respondent client devices can display the survey questions without also presenting the event (e.g., displaying the survey question with a description of the event).

In one or more embodiments, the administrator application 302 allows a user to set a single event type for a plurality of survey questions in a survey. For example, if the user creates more than one survey question (e.g., a first survey question and a second survey question, as illustrated in FIG. 3A), the user can apply the event type to some or all of the survey questions. The administrator application 302 can apply the event type to all of the questions in a survey by default or based on user input. If the administrator application 302 applies the same event type to more than one question, the creation interface 304 can display an option to allow the user to set the duration for each question, as described in more detail with respect to FIG. 3B.

Additionally, the option section 312 can include an option that allows the user to select one or more event types associated with the user. Selecting the event type can also include selecting the survey system as a digital media event host, a third party as a digital media event host, or a "live event" (i.e., "live user experience"). In at least some instances, the user can select more than one event type if the event is available via more than one communication medium (e.g., via a streaming video and a live user experience).

Additionally, selecting one or more of the event types can allow the user to provide additional information associated with the event. For example, selecting an uploaded event type hosted by the survey system can allow the user to choose a digital media event to upload to the servers. Selecting a third party host can allow the user to provide a URL or other pointer to a location of the digital media event on the third party content servers. Uploading or identifying a URL of a digital media event can cause the administrator application 302 to provide a preview 316 of the digital media event, such as in the question section 306. In one or more embodiments, selecting a live user experience allows the user to specify additional details such as the name of the event, the type of live user experience (e.g., concert, TV/radio program, political debate), a time of the event, time constraints associated with the survey question and/or survey based on the event, or other preferences that allow the survey system to accurately identify the event and associate perception data from respondents with the event.

The option section 312 also includes a measurements option 314e that allows the user to indicate to the survey system how frequently the respondent client devices measure perception ratings. Specifically, the measurement option 314e allows the user to select a setting for how frequently each respondent client device determines and stores a value associated with a perception question. For example, the user can opt to continuously collect measurements during the event, resulting in a plurality of perception data points each second to appear continuous. Alternatively, the user can opt to set a specific number of measurements per event, such that the respondent client devices store a plurality of perception data points divided evenly throughout the event based on the duration of the event. In yet another example, the user can enter a custom frequency (e.g., "every 5 seconds") or indicate to collect perception data only when a perception rating changes.

In one or more embodiments, the option section 312 includes a question type option 314f that allows the user to select an input type for the survey question. In particular, the input type indicates a type of graphical input element associated with the survey question. For example, the question type option 314f can allow the user to select from a plurality of input elements with different visual and/or functional characteristics for providing perception ratings. To illustrate, the user can select a slider input type (as illustrated in the survey questions of FIG. 3A), a dial input type, or other input type.

In addition to graphical input elements, the question type option 314f can allow the user to define different types of sources for collecting perception data for a perception question. For example, while interacting with a graphical input element can be useful in providing perception data during an event, other types of input methods can be beneficial in various implementations. To illustrate, the respondent client device can collect perception data from sources other than a user's interactions with a graphical input element. Other sources of perception data can include, but are not limited to, sensors (e.g., accelerometer or other motion sensors, heart rate monitor, brain wave sensors), video (e.g., face tracking, eye dilation), audio (e.g., audio of the event, user reactions such as laughter/breathing), and third party devices (e.g., smart watches, virtual/augmented reality devices). The additional sources of perception data can provide additional insight into the user's perception ratings, such as whether the user is paying attention to the event, and for increasing the accuracy of determining the perception ratings.

The option section 312 can also allow the user to perform additional actions associated with a survey question, such as providing display logic, skip logic, notes, or other functions that allow the user to further customize how a respondent client device present the survey question in user interfaces and/or how a survey behaves. By providing the user with a variety of options for determining the appearance and behavior of survey questions, the administrator application 302 can allow the user to create surveys with high customizability and detail. Surveys that include highly customizable perception questions for an event can provide accurate analysis and reporting of the perception ratings of the respondents.

As previously mentioned, the administrator application 302 can also allow the user to define durations for a plurality of survey questions associated with an event. Specifically, the administrator application 302 can allow the user to identify a specific portion of an event with which a specific question is associated, such that each question in the survey is associated with a different portion of the event. FIG. 3B illustrates a question assignment interface 318 in which a user can specify which portions of a digital media event are associated with which question from a plurality of survey questions. Although FIG. 3B illustrates a question assignment interface 318 that allows a user to visually assign different questions to different portions of a digital media event, the administrator application 302 can allow the user to assign questions to various portions of an event by manually entering the times, as described in relation to the duration option of FIG. 3A.

In one or more embodiments, the question assignment interface 318 allows a user to select an option to assign questions to portions of a digital media event. Alternatively, the administrator application 302 can automatically detect a plurality of questions associated with an event and request that the user assign the questions to portions of the event prior to finalizing the survey. In various embodiments, the question assignment interface 318 can display the survey questions from the survey in a question duration section 320 of the question assignment interface 318 and a preview 316 of the digital media event in a preview section 322 of the question assignment interface 318. The question duration section 320 and the preview section 322 can be any size, as may serve a particular embodiment, or may be customizable to allow the user to control a size of the preview of the digital media event. Additionally, navigation within the question duration section 320 and the preview section 322 can be independent, such that the user can navigate within the question duration section 320 to view different questions in the survey without affecting the presentation of the preview of the digital media event.

According to one or more embodiments, the question duration section 320 includes each of the questions in the survey. For example, the question duration section 320 can display the full questions (including answers) of the survey in a list view, as in FIG. 3B. Thus, the user can view the full questions and navigate from one question to another by scrolling up or down to view the questions. Alternatively, the question duration section 320 can include a summary of each question by displaying the question number and/or the text of the question.

Additionally, the question duration section 320 can include a time summary 324a, 324b for each of the questions in the survey. For instance, the question duration section 320 can display a time period for a question based on the start time, duration, and end time of the question in relation to the digital media event. To illustrate, the time summary 324a for a first question 326a may have a start time at the beginning of the digital media event and an end time somewhere in the middle of the digital media event. A second question 326b may have a start time after the end of the first question and an end time later in the digital media even (e.g., at the end of the digital media event), as reflected in the time summary 324b for the second question 326b. Although FIG. 3B illustrates the questions being associated with time periods from the beginning of the digital media event through to the end of the digital media event, a digital media event may include portions with which no question is associated.

In one or more embodiments, the preview section 322 presents the preview of a digital media event with a video control bar 328 (e.g., for playing a digital video). Specifically, the video control bar 328 includes one or more playback control elements that allow the user to preview playback of the digital media event within the preview section 322. For example, the playback control elements can include a play button 330 or a pause button for playing and pausing the digital media event. The video control bar 328 can also allow the user to move forward or backward in time in the digital media event, such as by manipulating an element that indicates a current position of the playback in the digital media event.

In addition to the playback control elements, the preview section 322 can allow the user to associate the questions in the survey with specific portions of the digital media event. For example, the preview section 322 can include a plurality of question elements 332a, 332b corresponding to the plurality of questions in the survey. To illustrate, for each question in the survey, the preview section 322 can include a question element representing the question. The question elements can include an identifier, such as a question number or text from the question, which allows the user to identify the corresponding question.

In one or more embodiments, the user associates a question with a specific portion of the digital media event by tapping/clicking and dragging the corresponding question element onto the video control bar 328. In particular, the administrator application 302 identifies the portion of the digital media event based on where the user drags the question element onto the video control bar 328. For instance, if the user drags a first question element 332a onto a first location on the video control bar 328, the administrator application 302 determines that the question associated with the first question element corresponds to a first portion of the digital media event. Additionally, if the user drags a second question element 332b onto a second location on the video control bar 328, the administrator application 302 determines that the question associated with the second question element corresponds to a second portion of the digital media event.

After applying a first question to a first portion of the digital media event, the administrator application 302 can update the video control bar 328 to display a first indicator 334a associated with the corresponding portion. Similarly, the administrator application 302 can update the video control bar 328 to display a second indicator 334b when the user applies a second question to a second portion of the digital media event. Thus, the video control bar 328 can display one or more indicators associated with questions in response to the user adding one or more questions to the video control bar 328.

Additionally, the administrator application 302 allows the user to move or delete indicators to modify associations between the questions and portions of the digital media event. For example, the user can select an indicator on the video control bar 328 and modify the location of the indicator in the video control bar 328 to change the association of one or more questions with one or more portions of the digital media event. To illustrate, the user can swap or shift indicators on the video control bar 328 by selecting an indicator and moving the indicator to a new location. The administrator application 302 updates the associations between the questions and corresponding portions of the digital media event based on the new locations of the indicators.

In one or more embodiments, if the digital media event has only a single question associated with the digital media event, the administrator application 302 can determine that the question applies to all of the digital media event, though the user can modify the association. If the digital media event has more than one question associated with different portions of the digital media event, the administrator application 302 can automatically select the portions based on the number of questions. To illustrate, if the digital media event is associated with two questions, the administrator application 302 can automatically associate the questions with two portions of the digital media event of equal length (e.g., each corresponding to half of the digital media event). The administrator application 302 can automatically adjust the positions and length of the indicators in response to the user adding a new question element to the video control bar 328.

In addition, the administrator application 302 can allow the user to make manual adjustments to the sizes of the indicators on the video control bar 328. For example, the administrator application 302 can allow the user to adjust the start time or the end time of a question by selecting an edge of the indicator and dragging left or right along the video control bar 328. The administrator application 302 can automatically adjust start time and/or end time of another question based on the modifications to another question. To illustrate, if the user adjusts the end time of the first question using the corresponding question element, the administrator application 302 can automatically adjust the start time of the second question while updating the corresponding question element in the video control bar 328. Alternatively, the user can manually adjust start times and end times independently of other questions.

In at least some instances, the administrator application 302 can prevent a user from causing two indicators to overlap. Additionally, the administrator application 302 can prevent a user from shrinking the duration of a question below a threshold time period. The administrator application 302 can also apply other constraints to the addition of questions to a digital media event, such as based on the duration of the digital media event. Thus, the administrator application 302 may prevent a user from adding more than a certain number of questions to a digital media event due to the duration of the digital media event.

After creating a survey, including one or more questions, the administrator application 302 can allow the user to preview the survey. For example, FIG. 3C illustrates a preview interface 336 in which the administrator application 302 displays how the survey will appear and/or operate on a respondent client device. Specifically, the preview interface 336 includes a testing area 338 where the user can test the functionality of the survey and the questions in the survey. For example, the testing area 338 can include the survey questions from the survey to allow the user to interact with the survey questions by selecting answers and/or otherwise interacting with input elements associated with the surveys. For a perception question, the testing area 338 can allow the user to view a digital media stream (if applicable) and provide perception data input by interacting with a graphical input element (such as a slider) while viewing the digital media stream.

Additionally, the preview interface 336 can also include a device preview area 340 of the survey on an example respondent client device. For example, the preview interface 336 of FIG. 3C includes a digital representation of a respondent client device displaying the survey with a digital media event. The digital representation 342 of the respondent client device provides the user with insight into how respondents will view the survey. Viewing the digital representation of the respondent client device with the survey can allow the user to determine whether the user needs to modify an aspect of the survey and/or questions in the survey to improve an aesthetic appearance of the survey.

Figure 4:
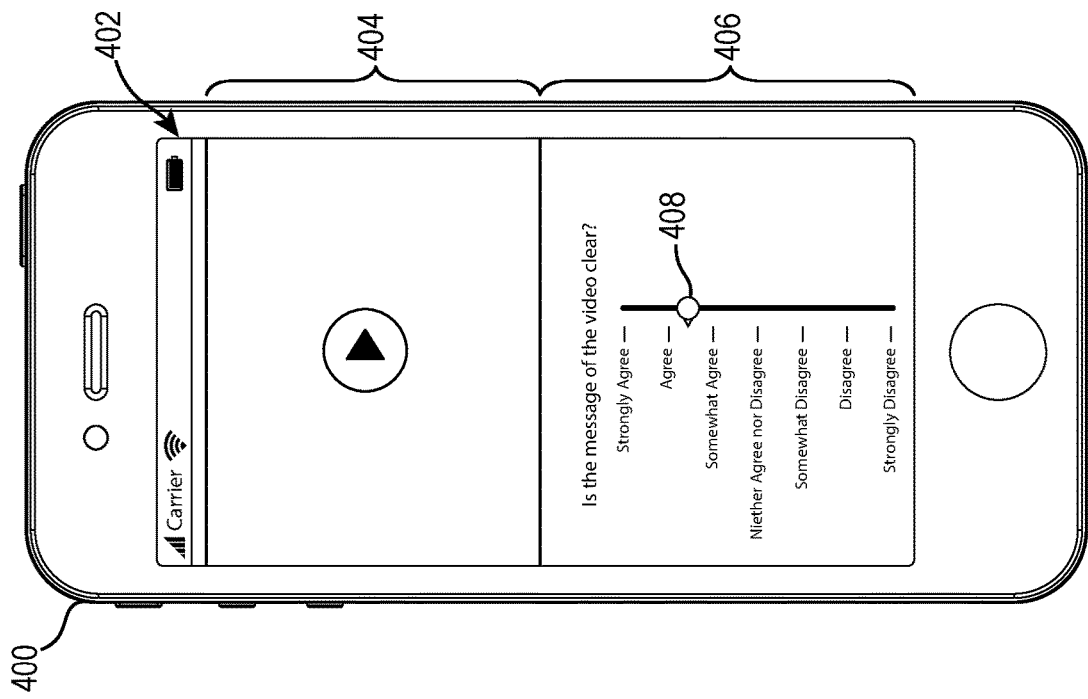
FIG. 4 illustrates an example graphical user interface for responding to an electronic survey in accordance with one or more embodiments.

FIG. 4 illustrates an embodiment of a respondent client device 400 that includes a respondent application 402. The respondent application 402 allows a user (e.g., respondent) to interact with a survey from the survey system. Specifically, the respondent application 402 allows the user to provide responses to one or more questions of a survey in connection with an event. For example, the respondent application 402 can allow the user to provide perception ratings while experiencing an event. As previously mentioned, the user can experience a digital media event (via the respondent client device) or a live user experience event (via another device or in person).

According to one or more embodiments, the respondent application 402 allows the user to answer survey questions while also viewing or otherwise experiencing a digital media event. For example, the respondent application 402 can be an application that integrates media playback with survey capabilities, as illustrated in FIG. 4. To illustrate, the respondent application 402 can present the digital media event in a media interface 404 and the survey in a survey interface 406. As such, the user can watch or listen to the digital media event while interacting with a survey question to provide perception ratings during the digital media event.

In one or more embodiments, the survey interface 406 presents a question from the survey in connection with the digital media event. Specifically, the survey can include a plurality of questions, at least one of which requests that the user provide perception data for the digital media event. The respondent application 402 can identify a survey question to display in the survey interface 406 based on a current playback position of the digital media event. For example, the respondent application 402 can identify an association between the question and the portion of the digital media event based on information in the survey (e.g., metadata). While the portion of the digital media event is playing in the media interface 404, the survey interface 406 continues displaying the corresponding question. If the portion of the digital media event currently playing changes to a new portion associated with a different question, the survey interface 406 updates with the new question.

The survey interface 406 can display a graphical input element that allows the user to set different values based on the user's perception ratings during the event. For example, as the user watches a digital video, the user can interact with a graphical input element 408 (e.g., a slider) to select a perception rating. If the user's perception rating changes at any time during the event, the user can interact with the graphical input element 408 to change the perception rating to a new value. To illustrate, if the user initially agrees with the survey question, the user can set the perception rating to, or near, "Strongly Agree." If the user at any time disagrees with the survey question, the user can change the perception rating to another rating below "Strongly Agree," such as "Disagree."

Although FIG. 4 illustrates a survey in connection with a digital media event presented on the respondent client device, the survey can be in connection with a live user experience. As previously described, the respondent application 402 can provide a survey for a user to complete during a live user experience. In such an embodiment, the respondent application 402 presents a perception question for the user to provide perception ratings for the live user experience.

As previously mentioned, the administrator of a survey can establish settings associated with the survey and/or survey questions. For example, the administrator can set a measurement frequency for a question. The measurement frequency determines how often the respondent application 402 will cause the respondent client device to collect, store, and/or transmit perception data to the survey system. The respondent client device collects perception data points by determining a current position or input associated with the graphical input element and stores a corresponding value as a perception data point.

In one or more embodiments, the survey administrator can change or create new questions to provide to client devices associated with respondents during the live user event based on what is happening in the live user event. For instance, and administrator, via the administrator client device 106, can view the live event and submit survey questions at the same time the event is proceeding. Thus, a survey administrator can customize the survey of the live event with the proceedings of the live event.

In some embodiments, the respondent client device collects additional information for including with perception data. For instance, the respondent client device can collect timestamp data for the perception data points for verifying synchronization of the perception data with the event and for generating perception data reports. In addition, the respondent client device can correlate perception data with geolocation data associated with the client device (e.g., GPS coordinates or City, State location). In another example, the respondent client device can obtain other types of perception data from additional sources, such as sensors, video, audio, and third party devices, as previously mentioned. The respondent client device can collect such perception data instead of perception data from a user's interactions with a graphical input element.

Alternatively, the respondent client device can collect perception data from one or more additional sources to supplement perception data from a user's interactions with a graphical input element. For example, the respondent client device can collect audio or video (e.g., an audio/video thumbprint) of a live user experience for synchronizing perception data points with the correct portions of the event. To illustrate, the respondent client device can intermittently capture audio of the event as the user experiences the event to match up with a recording of the event. Based on matching the captured audio from a respondent client device with a specific portion of the event, the survey system can determine that perception data points are associated with the specific portion of the event. In one or more implementations, the survey system can modify or otherwise correct a synchronization of a perception data point with the event if the survey system determines that the synchronization was incorrect.

In one or more embodiments, the survey system provides a follow up question to the respondent client device based on the perception ratings of the user. In particular, the survey system can analyze the user's perception data to identify one or more characteristics of the perception data and provide a follow up question to obtain more detail about the user's perception rating at a specific time. For example, the survey system can identify a highest or lowest perception rating of the user for the event and provide a follow up question that asks the user to respond with why the user provided the perception rating at that point in the event. The respondent application 402 can display the follow up question in the survey interface 406 after the event is finished, or during a break in the event.

In accordance with providing a follow up question, the survey system can determine a specific portion of the event to which the perception rating corresponds. For example, in the case of a digital media event, the survey system can identify a specific time or range of times of the digital media event associated with the perception rating. In one or more embodiments, the survey system can send a request to the respondent application 402 to replay the portion of the digital media event in conjunction with the follow up question. To illustrate, the survey system can use a predefined range of times based on metadata of the digital media event, audio analysis to identify beginnings of sentences or thoughts, scene detection to determine when a scene starts, or other audio/video analysis techniques to determine at what point in the digital media event to begin the playback on the respondent client device and/or how much lead in time to provide. Thus, the survey system can automatically identify and playback a portion of the digital media event to refresh the user's memory when asking a follow up question about why the user indicated the perception rating for that portion of the digital media event.

In one or more embodiments, the respondent application 402 also uses perception data or other information from the respondent client device 400 to determine the user's interest level. For example, the respondent application 402 can determine if the user is actively experiencing the event (e.g., based on face tracking or eye movements). If the user loses focus, the respondent application 402 can provide a nudge/reminder (e.g., vibration) to remind the user to focus on the event. The survey system may be able to identify when a nudge occurs and discount or ignore perception data from that user for a period of time after a nudge to avoid inserting erroneous data into the dataset. In another embodiment, the respondent application 402 can provide a notification or nudge when a follow up question is available to the user.

Figure 5A:
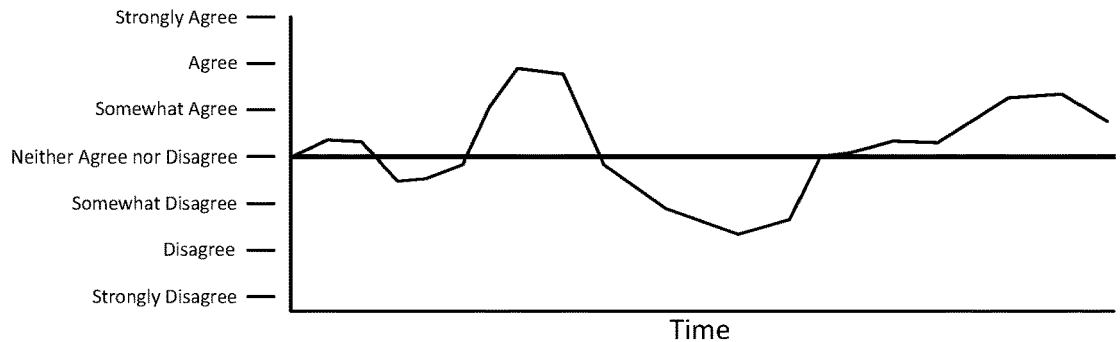
FIGS. 5A-5C illustrate graph diagrams of perception data for an event in accordance with one or more embodiments.
Figure 5B:
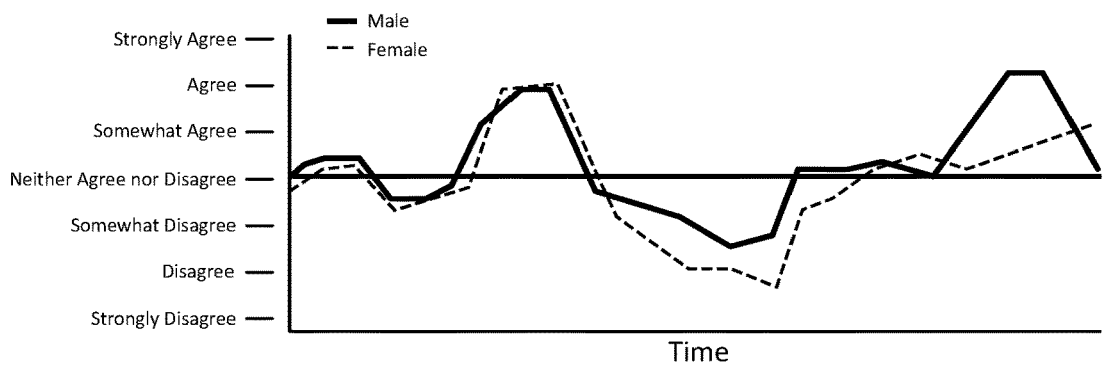
Figure 5C:
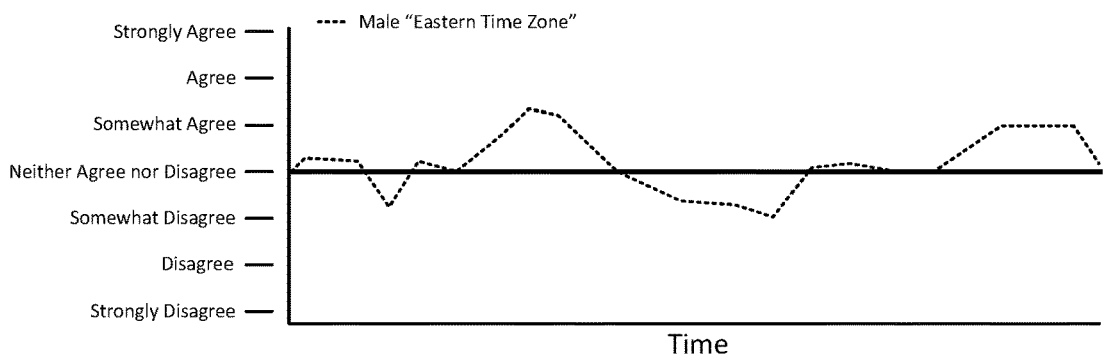

As previously described, the survey system can also provide reporting of perception data analysis to one or more users or entities (e.g., survey creator or content creator). Specifically, the survey system can use user profile information to generate one or more reports describing perception data from a plurality of respondents for an event. FIGS. 5A-5C illustrate a plurality of graph diagrams showing perception data reports to illustrate perception data over time for an event.

A user can request a perception data report from the survey system to include an indication of respondents' perception ratings during the event for one or more questions. In particular, FIG. 5A illustrates a graph diagram with a perception data report 500 indicating averaged perception data for all respondents during an event. The survey system uses received perception data point sets for the respondents to calculate average perception ratings over a specified time period. The specified time period can cover the entire event or only a portion of the event. As shown, a perception rating of respondents can vary over time as the respondents' feelings change about the event with respect to the question.

A user can also request a perception data report from the survey system to show the perception ratings for a plurality of different groups of respondents having one or more different characteristics, such as the characteristics provided in respondents' user profiles. FIG. 5B illustrates a graph diagram with a perception data report 502 indicating averaged perception ratings for all male respondents and for all female respondents for an event. Specifically, the perception data report indicates the perception data for the males and the females on different lines. Thus, the user can identify how each sex perceived the event at different points in time.

FIG. 5C illustrates a graph diagram with a perception data report 504 that indicates averaged perception ratings for all male respondents within a specific time zone. As shown, the survey system can allow a user to generate a perception data report for a plurality of selected characteristics. Providing a high level of customizability in generating perception data reports allows content creators, event managers, etc., to determine how to improve a message for certain demographics by identifying the specific times that resulted in negative or unfavorable perceptions among a specific demographic.

Accordingly, as shown in FIGS. 5A-5C, the survey systems ability to correlate perception data from a respondent, additional contextual information about the respondent received from the respondent client device, and/or profile information from numerous users across vast geographic regions and having vastly varying profile details allows the survey system to generate insights, provide detailed reports, and provide contextual information data with perception data on a large scale and even real-time or semi-real-time basis.

Figure 6:
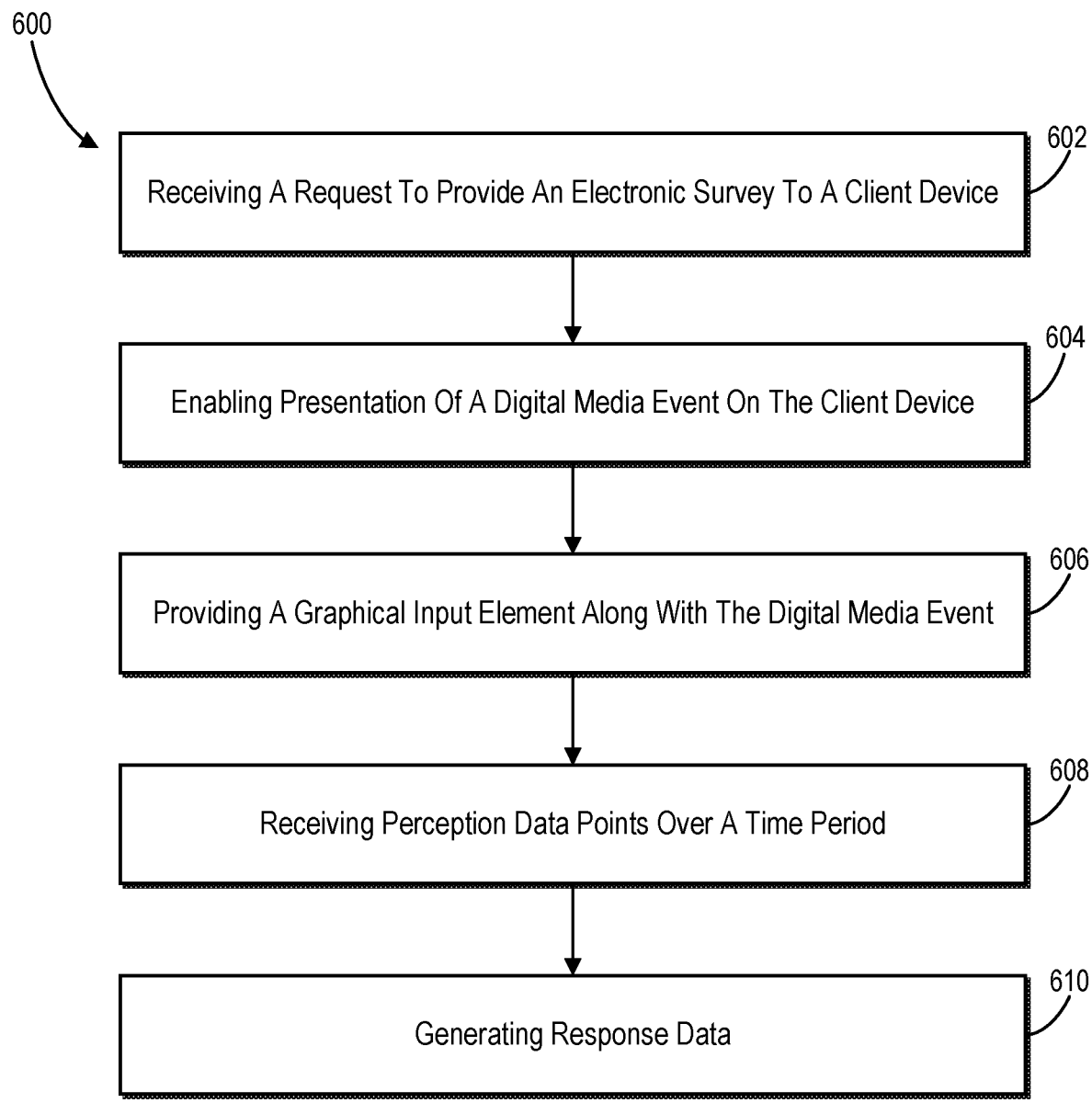
FIG. 6 illustrates a flowchart of a series of acts in a method for presenting views of electronic content in accordance with one or more embodiments.
Figure 7:
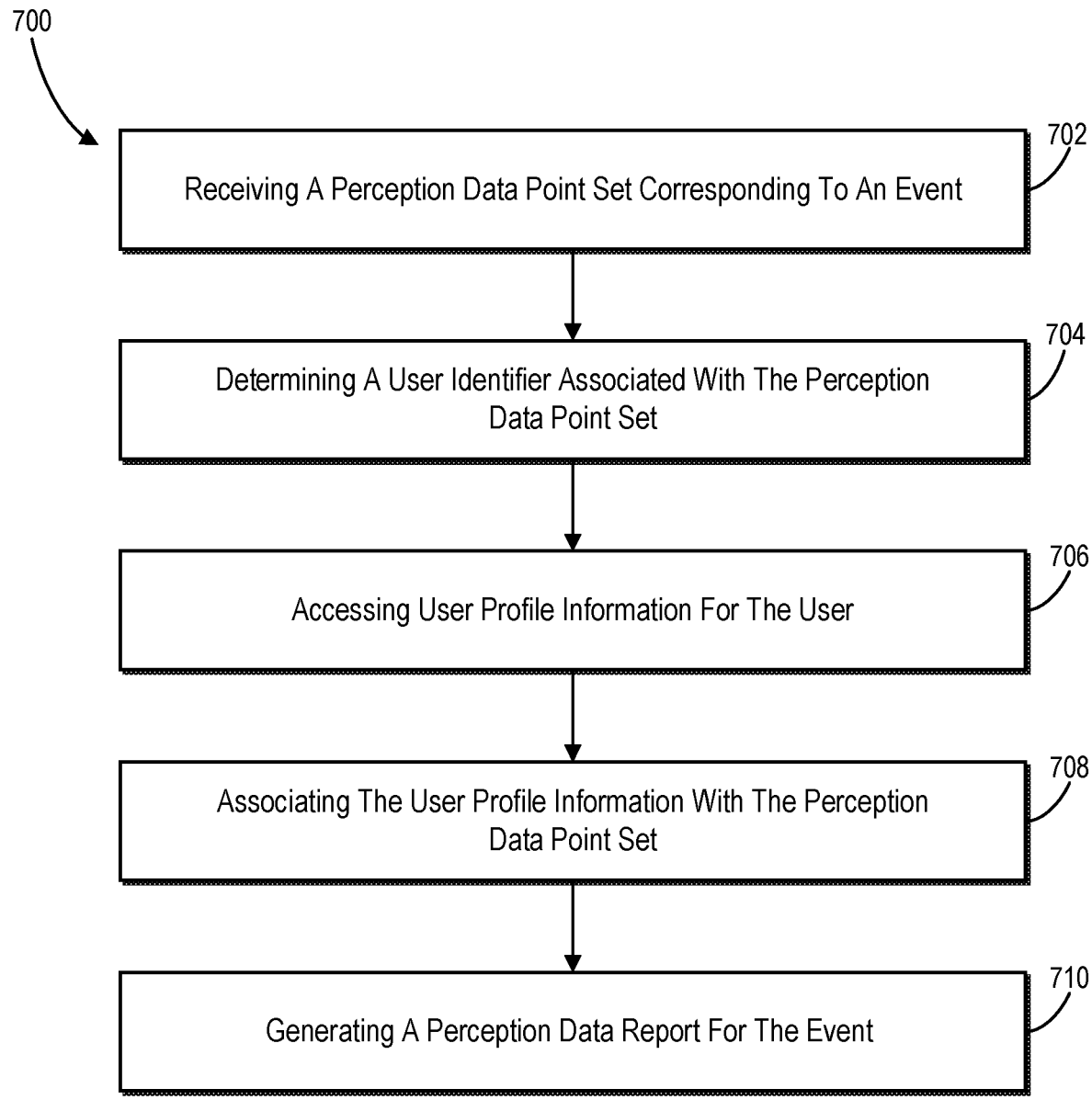
FIG. 7 illustrates a flowchart of a series of acts in a method for generating response data based on perception data for an event in accordance with one or more embodiments.

FIGS. 1-5C, the corresponding text, and the examples, provide a number of different systems, devices, and graphical user interfaces for creating and administering an electronic survey for an event. In addition to the foregoing, embodiments disclosed herein also can be described in terms of flowcharts comprising acts and steps in a method for accomplishing a particular result. For example, FIGS. 6-7 illustrate flowcharts of exemplary methods in accordance with one or more embodiments disclosed herein. The methods described in relation to FIGS. 6-7 can be performed with less or more steps/acts or the steps/acts can be performed in differing orders. Additionally, the steps/acts described herein can be repeated or performed in parallel with one another or in parallel with different instances of the same or similar steps/acts.

FIG. 6 illustrates a flowchart of an example method 600 for creating and administering an electronic survey for an event. The method 600 includes an act 602 of receiving a request to provide an electronic survey to a client device. For example, act 602 involves receiving a request to provide an electronic survey to a client device associated with a respondent, the electronic survey comprising a plurality of electronic survey questions. Additionally, act 602 can involve, in response to receiving the request, administering an electronic survey question from the plurality of electronic survey questions. Act 602 can also involve identifying, from the plurality of electronic survey questions, a first electronic survey question and a second electronic survey question, administering the first electronic survey question on the client device associated with the respondent during a first time period of the digital media event, and administering the second electronic survey question on the client device associated with the respondent during a second time period of the digital media event.

As part of act 602, or as an additional act, the method 600 can include identifying a setting associated with administering the electronic survey, and determining, based on the identified setting, a measurement frequency for measuring the plurality of perception data points on the client device. Alternatively, the method 600 can include identifying a duration of the digital media event, and determining, based on the identified duration, a measurement frequency for measuring the plurality of perception data points on the client device.

The method 600 also includes an act 604 of enabling presentation of a digital media event on the client device. For example, act 604 involves enabling presentation of a digital media event on the client device associated with the respondent. Act 604 can involve enabling simultaneous presentation of the digital media event and the graphical input element on the client device. For example, act 604 can involve enabling presentation of the digital media event and the graphical input element on the client device via a respondent application that integrates media presentation and survey administration.

The method 600 further includes an act 606 of providing a graphical input element along with the digital media event. For example, act 608 involves providing, for presentation on the client device along with the digital media event, a graphical input element with which the respondent can interact. The graphical input element can include a plurality of possible perception ratings for selection by the respondent in a graphical user interface of the client device associated with the respondent. For example, the graphical input element can include a slider graphical element or a dial graphical element including a plurality of different settings corresponding to a plurality of perception ratings.

The method 600 also includes an act 608 of receiving perception data points over a time period. For example, act 608 involves receiving, from the client device, a plurality of perception data points over a time period based on the respondent's interaction with the graphical input element during the presentation of the digital media event, wherein each perception data point from the plurality of perception data points corresponds to a portion of the digital media event. For example, a perception data point can correspond to a time of the digital media event. Alternatively, a perception data point can correspond to a range of times of the digital media event.

Act 608 can involve receiving a plurality of perception data point sets comprising a plurality of perception data points from a plurality of client devices associated with a plurality of respondents. The method 600 can include administering the electronic to the plurality of client devices at different times and enabling presentation of the digital media event on the plurality of client devices at different times. Additionally, the method 600 can include receiving perception data from the plurality of client devices at different times based on when the digital media event was presented on the plurality of client devices.

Additionally, the method 600 includes an act 610 of generating response data. For example, act 610 involves generate, based on the received plurality of perception data points, response data for the electronic survey question. Act 610 can also involve identifying a perception data point from the plurality of perception data points, the identified perception data point comprising a perception rating that meets a threshold, and administering an additional electronic survey question to the client device based on the identified perception data point comprising the perception rating that meets the threshold.

Act 610 can further involve identifying the portion of the digital media event corresponding to the identified perception data point, and enabling playback of the identified portion of the digital media event on the client device in connection with the additional electronic survey question. For example, enabling playback of the identified portion of the digital media event can involve determining a start time and an end time associated with the identified portion of the digital media event, and enabling playback of the identified portion of the event on the client device from the start time to the end time.

FIG. 7 illustrates a flowchart of an example method 700 for providing analysis of perception data over time for an event. The method 700 includes an act 702 of receiving a perception data point set corresponding to an event. For example, act 702 involves receiving, from a client device and by one or more servers, a perception data point set corresponding to an event experienced by a user associated with the client device, wherein the perception data point set indicate a perception rating of the event over a time period for the user.

Act 702 can involve receiving, from a plurality of client devices, a plurality of perception data point sets indicating a perception rating of the event over a time period for each user from the plurality of users, and associating user profile information corresponding to the plurality of users with the plurality of perception data point sets.

As part of act 702, or as an additional act, the method 700 can include receiving a request to provide an electronic survey to the client device in connection with the event, providing at least one electronic survey question to the client device in connection with the event, and receiving, in response to providing the at least one electronic survey question to the client device, the perception data point set corresponding to the event experienced by the user associated with the client device.

Additionally, the method 700 can include determining that a first perception data point from the perception data point set is incorrectly synchronized with the event based on a timestamp of the first perception data point, receiving, from the client device, synchronization data corresponding to the first perception data point, and modifying, based on the received synchronization data, a synchronization of the first perception data point with the event.

The event can include an event hosted by the one or more servers, an event hosted by a third party content server, or a live user experience event. For example, the method 700 can include determining that a plurality of respondents experience the event via at least two different types. For example, a first respondent can experience the event by accessing a digital media version of the event, and a second respondent can experience the event via a live user experience. Additionally, the method 700 can include synchronizing a first perception data point set for the first respondent with a second perception data point set for the second respondent.

Additionally, the method 700 includes an act 704 of determining a user identifier associated with the perception data point set. For example, act 704 can involve determining a user identifier by receiving the user identifier with the perception data point set from the client device. For example, the user identifier can include a user identifier that indicates the user. Alternatively, act 704 can involve determining the user identifier based on a device identifier from the client device. In another example, act 704 can involve determining the user identifier based on the client device accessing an application store to download a survey application in connection with a user profile of the user with the application store.

The method 700 also includes an act 706 of accessing user profile information for the user. For example, act 706 involves accessing, for the user and based on the user identifier, user profile information from a user profile corresponding to the user. Act 706 can involve accessing the user profile on the one or more servers. Additionally, the user profile information can include location information, device information, demographic information, or personal information associated with the user.

The method 700 further includes an act 708 of associating the user profile information with the perception data point set. For example, act 708 involves associating, for the user, the accessed user profile information from a user profile with the perception data point set. Act 708 can involve storing the user profile information with the perception data point set in a database.

The method 700 also includes an act 710 of generating a perception data report for the event. For example, act 710 involves generating, by the one or more servers, a perception data report for the event using the user profile information associated with the perception data point set. Act 710 can involve determining a characteristic of a subset of users from the plurality of users based on the user profile information corresponding to the plurality of users, and generating the perception data report to display a plurality of perception data point sets for the subset of users with the determined characteristic. For example, act 710 can involve receiving, from a client device associated with a survey administrator, a request to generate the perception data report for a selected characteristic, and providing the perception data report for the selected characteristic to the client device associated with the survey administrator.

Alternatively, act 710 can also involve generating the perception data report to include a predetermined set of characteristics corresponding to a plurality of users. For example, generating the perception data report to include the predetermined set of characteristics can involve accessing a plurality of user profiles associated with the plurality of users, determining a plurality of characteristics of each user from the plurality of users, and storing the plurality of characteristics of each user from the plurality of users in metadata of the perception data report to create a dynamic perception data report that a user can modify to view different representations of the perception data report based on the plurality of characteristics.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
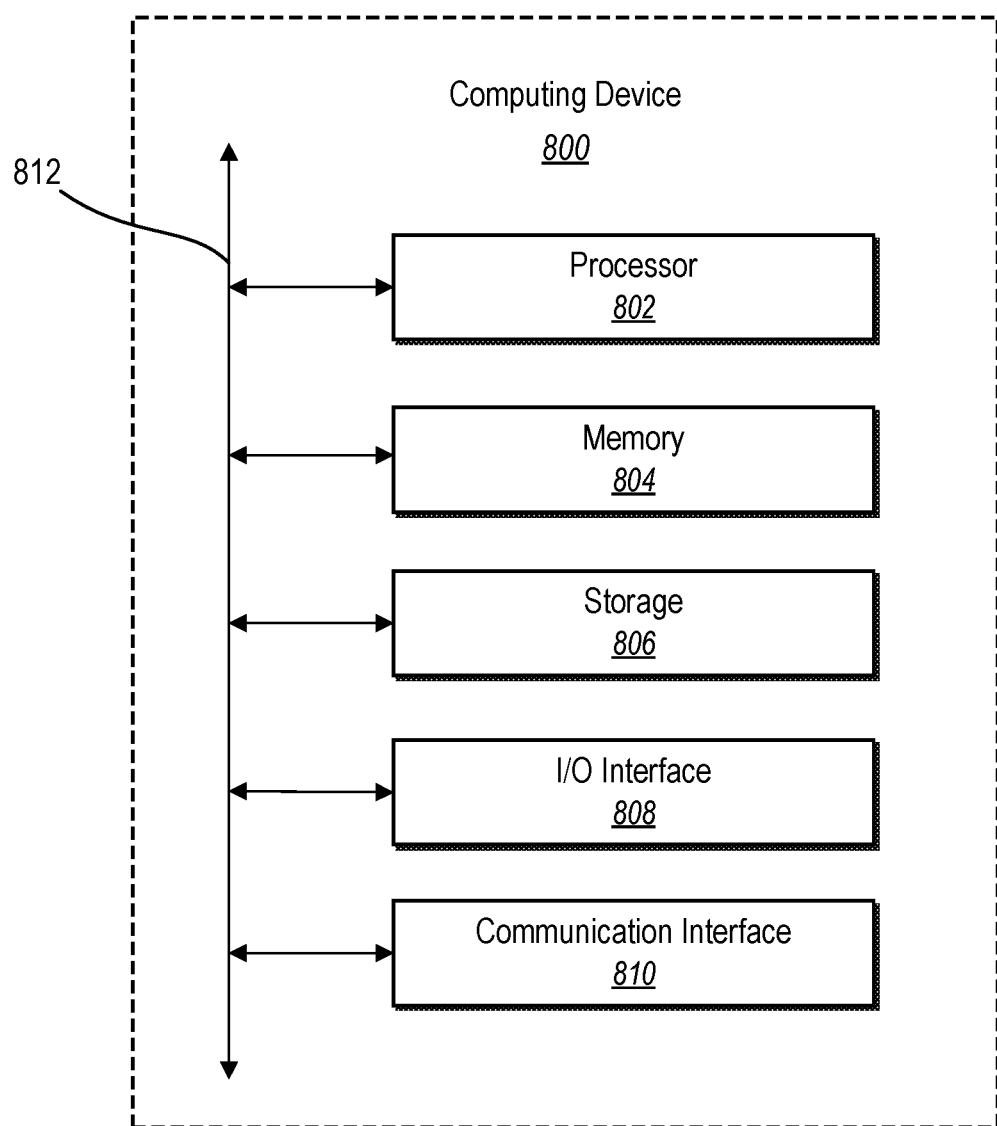
FIG. 8 illustrates a block diagram of a computing device in accordance with one or more embodiments.

FIG. 8 illustrates a block diagram of exemplary computing device 800 that may be configured to perform one or more of the processes described above. One will appreciate that one or more computing devices such as the computing device 800 may implement the various devices of the environment 100 of FIG. 1. As shown by FIG. 8, the computing device 800 can comprise a processor 802, a memory 804, a storage device 806, an I/O interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In one or more embodiments, the processor 802 may include one or more internal caches for data, instructions, or addresses. As an example and not by way of limitation, the processor 802 may include one or more instruction caches, one or more data caches, and one or more translation lookaside buffers (TLBs). Instructions in the instruction caches may be copies of instructions in the memory 804 or the storage 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. The storage device 806 may include removable or non-removable (or fixed) media, where appropriate. The storage device 806 may be internal or external to the computing device 800. In one or more embodiments, the storage device 806 is non-volatile, solid-state memory. In other embodiments, the storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 9:
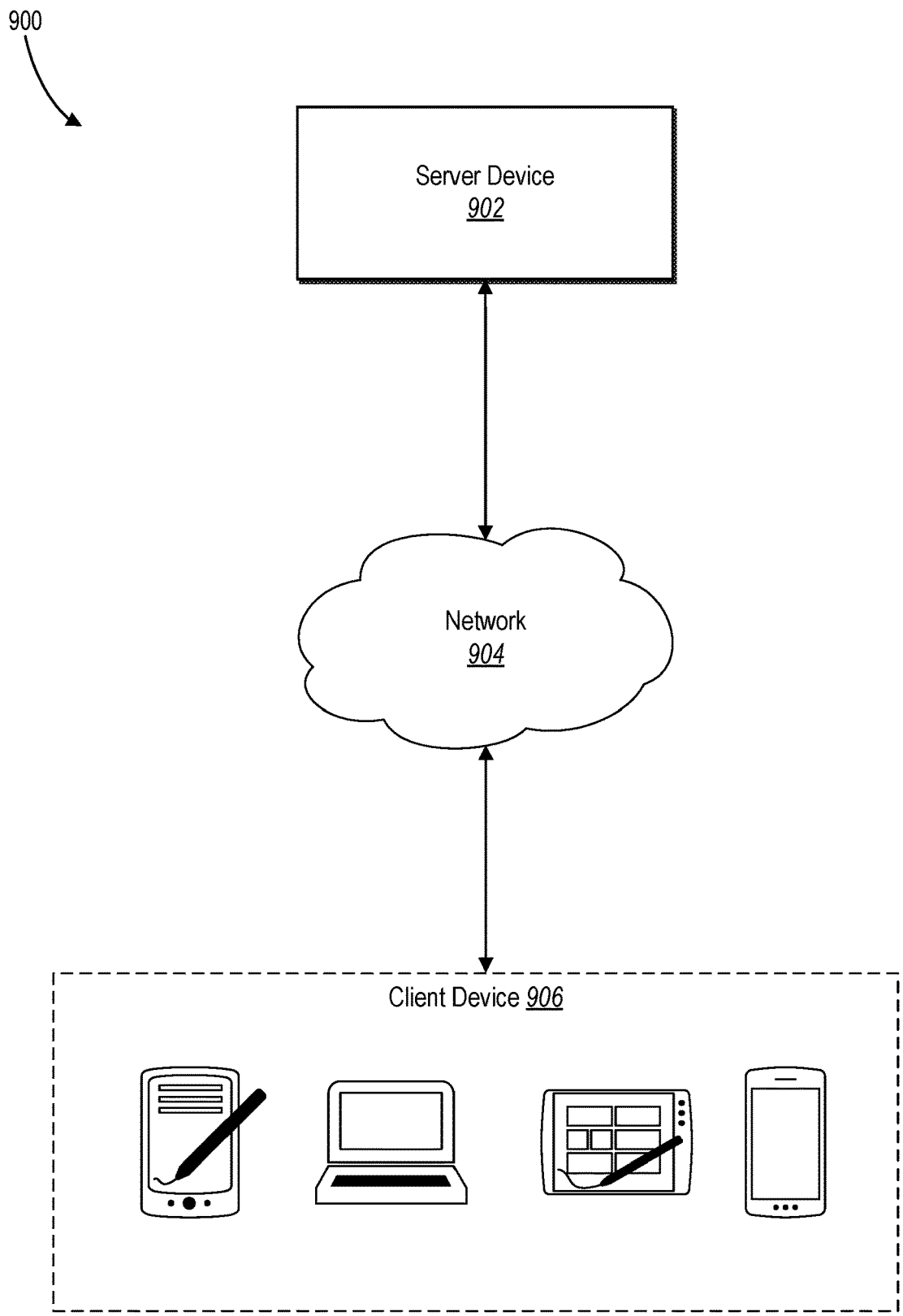
FIG. 9 illustrates a networking environment of a survey system in accordance with one or more embodiments.

FIG. 9 illustrates an example network environment 900 for a survey system 102. Network environment 900 includes a client device 906, and a server device 902 connected to each other by a network 904. Although FIG. 9 illustrates a particular arrangement of client system 906, server device 902, and network 904, this disclosure contemplates any suitable arrangement of client device 906, server device 902, and network 904. As an example and not by way of limitation, two or more of client device 906, and server device 902 may be connected to each other directly, bypassing network 904. As another example, two or more of client device 906 and server device 902 may be physically or logically co-located with each other in whole, or in part. Moreover, although FIG. 9 illustrates a particular number of client devices 906, survey systems 902, and networks 904, this disclosure contemplates any suitable number of client devices 906, survey systems 902, and networks 904. As an example and not by way of limitation, network environment 900 may include multiple client devices 906, survey systems 902, and networks 904.

This disclosure contemplates any suitable network 904. As an example and not by way of limitation, one or more portions of network 904 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 904 may include one or more networks 904.

Links may connect client device 906, and server device 902 to communication network 904 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, client device 906 may be an electronic device including hardware, software, or embedded logic components or a combination of two or more such components and capable of carrying out the appropriate functionalities implemented or supported by client device 906. As an example and not by way of limitation, a client device 906 may include any of the computing devices discussed above in relation to FIG. 8. A client device 906 may enable a network user at client device 906 to access network 904. A client device 906 may enable its user to communicate with other users at other client systems 806.

In particular embodiments, client device 906 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client device 906 may enter a Uniform Resource Locator (URL) or other address directing the web browser to a particular server (such as server, or a server associated with a third-party system), and the web browser may generate a Hyper Text Transfer Protocol (HTTP) request and communicate the HTTP request to server. The server may accept the HTTP request and communicate to client device 906 one or more Hyper Text Markup Language (HTML) files responsive to the HTTP request. Client device 906 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server device 902 may include a variety of servers, sub-systems, programs, modules, logs, and data stores. In particular embodiments, server device 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 902 may also include suitable components such as network interfaces, security mechanisms, load balancers, failover servers, management-and-network-operations consoles, other suitable components, or any suitable combination thereof.

In particular embodiments, server device 902 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method comprising:
   receiving a request to provide an electronic survey to a client device associated with a respondent;
   in response to receiving the request, administering a single electronic survey question of the electronic survey, wherein administering the single electronic survey question comprises:
   enabling presentation of a digital media event on the client device associated with the respondent;
   providing, for presentation on the client device along with the digital media event, a graphical input element with which the respondent can interact over a time period to answer the single electronic survey question, the graphical input element comprising a slider input element or a dial input element that causes the client device to store a value of a perception data point indicating a perception rating based on an interaction with the slider input element or the dial input element for a time range of the digital media event;
   receiving, from the client device, a plurality of perception data points over the time period for the single electronic survey question based on the respondent's interaction with the graphical input element during the presentation of the digital media event;
   storing, for each perception data point from the plurality of perception data points, a value that indicates a perception rating of the respondent corresponding to a separate time range of the digital media event; and
   associating an identified perception data point of the plurality of perception data points with a specific time range of the digital media event by storing metadata indicating the specific time range of the digital media event for the identified perception data point;

generating, based on the received plurality of perception data points, response data for the single electronic survey question;
determining that the identified perception data point from the plurality of perception data points has a perception rating that meets a rating threshold by determining that the stored value of the identified perception data point meets the rating threshold; and
administering, to the client device, an additional electronic survey question related to the single electronic survey question in response to determining that the value of the identified perception data point of the single electronic survey question meets the rating threshold, the additional electronic survey question being different than the single electronic survey question, by:
  determining, utilizing the metadata stored for the identified perception data point of the single electronic survey question, a question portion for the additional electronic survey question related to the perception rating of the respondent at the specific time range of the digital media event corresponding to the identified perception data point;
  determining, in connection with determining the question portion for the additional electronic survey question, a start time and an end time of a portion of the digital media event corresponding to the specific time range associated with the identified perception data point; and
  initiating, for display at the client device, a replay of the portion of the digital media event from the start time to the end time in response to providing the additional electronic survey question to the client device.

2. The method as recited in claim 1, further comprising:
receiving, from the client device, an indication of a user interest level in the digital media event based on face tracking or eye tracking by the client device; and
providing, to the client device, a notification to remind the user to focus on the digital media event based on the user interest level.

3. The method as recited in claim 1, further comprising:
receiving, from an additional client device associated with an additional respondent, a plurality of additional perception data points indicating perception ratings of the additional respondent during a presentation of a live user experience associated with the digital media event; and synchronizing the plurality of perception data points corresponding to the digital media event with the plurality of additional perception data points corresponding to the live user experience.

4. The method as recited in claim 1, wherein determining the start time and the end time of the portion of the digital media event comprises detecting, utilizing audio/video analysis of the digital media event, a beginning of a scene of the digital media event corresponding to the identified perception data point.

5. The method as recited in claim 1, wherein enabling presentation of the digital media event comprises enabling simultaneous presentation of the digital media event and the graphical input element on the client device.

6. The method as recited in claim 1, further comprising:
identifying a setting associated with administering the electronic survey; and
determining, based on the identified setting, a measurement frequency for measuring the plurality of perception data points on the client device over the time period using the graphical input element.

7. The method as recited in claim 1, further comprising:
identifying a duration of the digital media event; and
determining, based on the identified duration, a measurement frequency for measuring the plurality of perception data points on the client device over the time period using the graphical input element.

8. The method as recited in claim 1, wherein administering the electronic survey question further comprises:
identifying, from a plurality of electronic survey questions, a first electronic survey question comprising the single electronic survey question and a second electronic survey question;
administering the first electronic survey question on the client device associated with the respondent during a first time period of the digital media event; and
administering the second electronic survey question on the client device associated with the respondent during a second time period of the digital media event.

9. The method as recited in claim 1, wherein the graphical input element comprises a plurality of possible perception ratings for selection by the respondent in a graphical user interface of the client device associated with the respondent.

10. A system comprising:
at least one processor; and
a non-transitory computer readable storage medium comprising instructions that, when executed by the at least one processor, cause the system to:
  receive a request to provide an electronic survey to a client device associated with a respondent;
  in response to receiving the request, administer a single electronic survey question from the electronic survey, wherein administering the single electronic survey question comprises:
    enabling presentation of a digital media event on the client device associated with the respondent;
    providing, for presentation on the client device along with the digital media event, a graphical input element with which the respondent can interact over a time period to answer the single electronic survey question, the graphical input element comprising a slider input element or a dial input element that causes the client device to store a value of a perception data point indicating a perception rating based on an interaction with the slider input element or the dial input element for a time range of the digital media event;
    receiving, from the client device, a plurality of perception data points over the time period for the single electronic survey question based on the respondent's interaction with the graphical input element during the presentation of the digital media event;
    storing, for each perception data point from the plurality of perception data points, a value that indicates a perception rating of the respondent corresponding to a separate time range of the digital media event; and
    associating an identified perception data point of the plurality of perception data points with a specific time range of the digital media event by storing metadata indicating the specific time range of the digital media event for the identified perception data point;
  generate, based on the received plurality of perception data points, response data for the single electronic survey question;

determine that the identified perception data point from the plurality of perception data points has a perception rating that meets a rating threshold by determining that the stored value of the identified perception data point meets the rating threshold; and administer, to the client device, an additional electronic survey question related to the single electronic survey question in response to determining that the value of the identified perception data point of the single electronic survey question meets the rating threshold, the additional electronic survey question being different than the single electronic survey question by:

determining, utilizing the metadata stored for the identified perception data point of the single electronic survey question, a question portion for the additional electronic survey question related to the perception rating of the respondent at the specific time range of the digital media event corresponding to the identified perception data point;

determining, in connection with determining the question portion for the additional electronic survey question, a start time and an end time of a portion of the digital media event corresponding to the specific time range associated with the identified perception data point; and initiating, for display at the client device, a replay of the portion of the digital media event from the start time to the end time in response to providing the additional electronic survey question to the client device.

11. The system as recited in claim 10, further comprising instructions that, when executed by the at least one processor, cause the system to:

receive, from the client device, an indication of a user interest level in the digital media event based on face tracking or eye tracking by the client device; and provide, to the client device, a notification to remind the user to focus on the digital media event based on the user interest level.

12. The system as recited in claim 10, further comprising instructions that, when executed by the at least one processor, cause the system to:

determine a measurement frequency for measuring the plurality of perception data points on the client device using the graphical input element; and receive, from the client device, the plurality of perception data points at a plurality of separate time ranges based on the measurement frequency.

13. The system as recited in claim 12, further comprising instructions that, when executed by the at least one processor, cause the system to generate a perception data report for the digital media event, wherein generating the perception data report comprises:

identifying, based on a user profile of the respondent, user profile information corresponding to the respondent;

determining a characteristic of the respondent based on the user profile information corresponding to the respondent; and generating the perception data report to display a plurality of perception data points for a plurality of respondents with the determined characteristic.

14. A non-transitory computer readable storage medium comprising instructions that, when executed by at least one processor, cause a computer system to:

receive a request to provide an electronic survey to a client device associated with a respondent;

in response to receiving the request, administer a single electronic survey question of the electronic survey, wherein administering the single electronic survey question comprises:

enabling presentation of a digital media event on the client device associated with the respondent;

providing, for presentation on the client device along with the digital media event, a graphical input element with which the respondent can interact over a time period to answer the single electronic survey question, the graphical input element comprising a slider input element or a dial input element that causes the client device to store a value of a perception data point indicating a perception rating based on an interaction with the slider input element or the dial input element for a time range of the digital media event;

receiving, from the client device, a plurality of perception data points over a time period for the single electronic survey question based on the respondent's interaction with the graphical input element during the presentation of the digital media event;

storing, for each perception data point from the plurality of perception data points, a value that indicates a perception rating of the respondent corresponding to a separate time range of the digital media event; and associating an identified perception data point of the plurality of perception data points with a specific time range of the digital media event by storing metadata indicating the specific time range of the digital media event for the identified perception data point;

generate, based on the received plurality of perception data points, response data for the single electronic survey question;

determining that the identified perception data point from the plurality of perception data points has a perception rating that meets a rating threshold by determining that the stored value of the identified perception data point meets the rating threshold; and administering, to the client device, an additional electronic survey question related to the single electronic survey question in response to determining that the value of the identified perception data point of the single electronic survey question meets the rating threshold, the additional electronic survey question being different than the single electronic survey question, by:

determining, utilizing the metadata stored for the identified perception data point of the single electronic survey question, a question portion for the additional electronic survey question related to the perception rating of the respondent at the specific time range of the digital media event corresponding to the identified perception data point;

determining, in connection with determining the question portion for the additional electronic survey question, a start time and an end time of a portion of the digital media event corresponding to the specific time range associated with the identified perception data point; and initiating, for display at the client device, a replay of the portion of the digital media event from the start time to the end time in response to providing the additional electronic survey question to the client device.

15. The non-transitory computer readable storage medium as recited in claim 14, further comprising instructions that, when executed by the at least one processor, cause the computer system to:
- receive, from the client device, an indication of a user interest level in the digital media event based on face tracking or eye tracking by the client device; and
- provide, to the client device, a notification to remind the user to focus on the digital media event based on the user interest level.

16. The non-transitory computer readable storage medium as recited in claim 14, further comprising instructions that, when executed by the at least one processor, cause the computer system to:
- identify a setting associated with administering the electronic survey; and
- determine, based on the identified setting, a measurement frequency for measuring the plurality of perception data points on the client device over the time period using the graphical input element.

17. The non-transitory computer readable storage medium as recited in claim 14, further comprising instructions that, when executed by the at least one processor, cause the computer system to:
- identify a duration of the digital media event; and
- determine, based on the identified duration, a measurement frequency for measuring the plurality of perception data points on the client device over the time period using the graphical input element.

18. The non-transitory computer readable storage medium as recited in claim 14, wherein the instructions that cause the computer system to administer the electronic survey question further cause the computer system to:
- identify, from a plurality of electronic survey questions, a first electronic survey question comprising the single electronic survey question and a second electronic survey question;
- administer the first electronic survey question on the client device associated with the respondent during a first time period of the digital media event; and
- administer the second electronic survey question on the client device associated with the respondent during a second time period of the digital media event.

19. The non-transitory computer readable storage medium as recited in claim 18, wherein the instructions that cause the computer system to administer the second electronic survey question cause the computer system to:
- provide, for presentation on the client device along with the digital media event during the second time period, a second graphical input element with which the respondent can interact over the second time period to answer the second electronic survey question; and
- receive, from the client device, a second plurality of perception data points over the second time period for the second electronic survey question based on the respondent's interaction with the second graphical input element.

20. The non-transitory computer readable storage medium as recited in claim 14, wherein the graphical input element comprises a plurality of possible perception ratings for selection by the respondent in a graphical user interface of the client device associated with the respondent.

\* \* \* \* \*